US012416487B2

(12) United States Patent
Yamada et al.

(10) Patent No.: US 12,416,487 B2
(45) Date of Patent: Sep. 16, 2025

(54) LASER INTERFEROMETER

(71) Applicant: SEIKO EPSON CORPORATION, Tokyo (JP)

(72) Inventors: Kohei Yamada, Shiojiri (JP); Takeshi Shimizu, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 343 days.

(21) Appl. No.: 18/173,182

(22) Filed: Feb. 23, 2023

(65) Prior Publication Data

US 2023/0280152 A1  Sep. 7, 2023

(30) Foreign Application Priority Data

Feb. 25, 2022  (JP) ................................ 2022-027697

(51) Int. Cl.
*G01B 9/02001* (2022.01)
*G01B 9/02* (2022.01)
*G01B 9/02055* (2022.01)
*G02B 26/06* (2006.01)

(52) U.S. Cl.
CPC ....... *G01B 9/0201* (2013.01); *G01B 9/02045* (2013.01); *G01B 9/02072* (2013.04); *G01B 9/02083* (2013.01); *G02B 26/06* (2013.01); *G01B 2290/70* (2013.01)

(58) Field of Classification Search
CPC .............. G01B 9/0201; G01B 9/02045; G01B 9/02072; G01B 9/02083; G01H 9/00; G02B 26/06

See application file for complete search history.

(56) References Cited

U.S. PATENT DOCUMENTS

| 5,903,350 A * | 5/1999 | Bush ................. G01B 9/02083 329/346 |
| 6,233,085 B1 * | 5/2001 | Johnson ................ G02F 1/0121 359/279 |
| 2022/0065613 A1 * | 3/2022 | Kitagawa ............... G02B 26/06 |
| 2023/0095129 A1 * | 3/2023 | Shimizu ............. G01B 9/02084 356/450 |

(Continued)

FOREIGN PATENT DOCUMENTS

| JP | H0954293 A | 2/1997 |
| JP | 2007285898 A | 11/2007 |

*Primary Examiner* — Michael A Lyons
(74) *Attorney, Agent, or Firm* — CHIP LAW GROUP

(57) ABSTRACT

A laser interferometer includes a laser light source that emits laser light, an optical modulator which superimposes a modulation signal on the laser light using a vibrator driven by a drive signal, a photodetector that receives the laser light including a sample signal and the laser light including the modulation signal, and outputs a light receiving signal, an oscillator that generates a reference signal, an amplifier that outputs the drive signal from the reference signal, and a processor that extracts a frequency modulation component from the light receiving signal and the reference signal, outputs a preprocessing signal including the frequency modulation component, demodulates the sample signal from the preprocessing signal and the reference signal, outputs a correction signal based on an output signal depending on driving of the vibrator, and corrects the drive signal and the reference signal based on the correction signal.

20 Claims, 14 Drawing Sheets

(56) References Cited

U.S. PATENT DOCUMENTS

| | | | | |
|---|---|---|---|---|
| 2023/0168120 A1* | 6/2023 | Hayashi | ................... | G01H 9/00 73/657 |
| 2023/0243636 A1* | 8/2023 | Yamada | ............. | G01B 9/02045 356/484 |
| 2023/0266161 A1* | 8/2023 | Yamada | ................... | G01H 9/00 73/657 |

* cited by examiner

LASER INTERFEROMETER

The present application is based on, and claims priority from JP Application Serial Number 2022-027697, filed Feb. 25, 2022, the disclosure of which is hereby incorporated by reference herein in its entirety.

BACKGROUND

1. Technical Field

The present disclosure relates to a laser interferometer.

2. Related Art

JP-A-2007-285898 discloses a laser vibrometer (laser interferometer) that irradiates an object with laser light and measures a vibration velocity based on scattered laser light subjected to a Doppler shift. In the laser vibrometer, a Doppler signal included in the scattered laser light is extracted by using optical heterodyne interferometry.

Further, in the laser vibrometer described in JP-A-2007-285898, a piezoelectric device or a quartz crystal resonator is used, and a frequency is shifted by irradiating the vibrator with laser light. The Doppler signal is demodulated from the scattered laser light by using, as reference light, laser light including a modulation signal whose frequency is shifted in this manner. The vibration velocity of the object can be measured based on the obtained Doppler signal.

For example, in the case of the quartz crystal resonator, a mechanical resonance frequency thereof changes under an influence of an ambient temperature. Therefore, when a modulation signal is generated by shifting a frequency of laser light using the quartz crystal resonator, the modulation signal changes as the temperature changes. As a result, an S/N ratio (signal-to-noise ratio) of the modulation signal decreases, and demodulation accuracy of the Doppler signal decreases. Therefore, it is a challenge to implement a laser interferometer capable of preventing a decrease in demodulation accuracy even when disturbance such as a temperature change is applied.

SUMMARY

A laser interferometer according to an application example of the present disclosure includes: a laser light source configured to emit laser light; an optical modulator including a vibrator driven by a drive signal and configured to superimpose a modulation signal on the laser light using the vibrator; a photodetector configured to receive the laser light including a sample signal superimposed thereon due to reflection by an object and the laser light including the modulation signal, and output a light receiving signal; a calculation unit configured to perform a calculation on the light receiving signal based on a reference signal; and a signal generation unit configured to output the drive signal and the reference signal, in which the calculation unit includes a preprocessing unit configured to perform preprocessing for extracting a frequency modulation component from the light receiving signal based on the reference signal, and output a preprocessing signal including the frequency modulation component, a demodulation processing unit configured to demodulate the sample signal from the preprocessing signal based on the reference signal, and a correction processing unit configured to output a correction signal based on an output signal output in response to driving of the vibrator, and the signal generation unit corrects the drive signal and the reference signal based on the correction signal.

DESCRIPTION OF EXEMPLARY EMBODIMENTS

Hereinafter, a laser interferometer according to the present disclosure will be described in detail based on embodiments shown in the accompanying drawings.

1. First Embodiment

First, a laser interferometer according to a first embodiment will be described.

Figure 1:
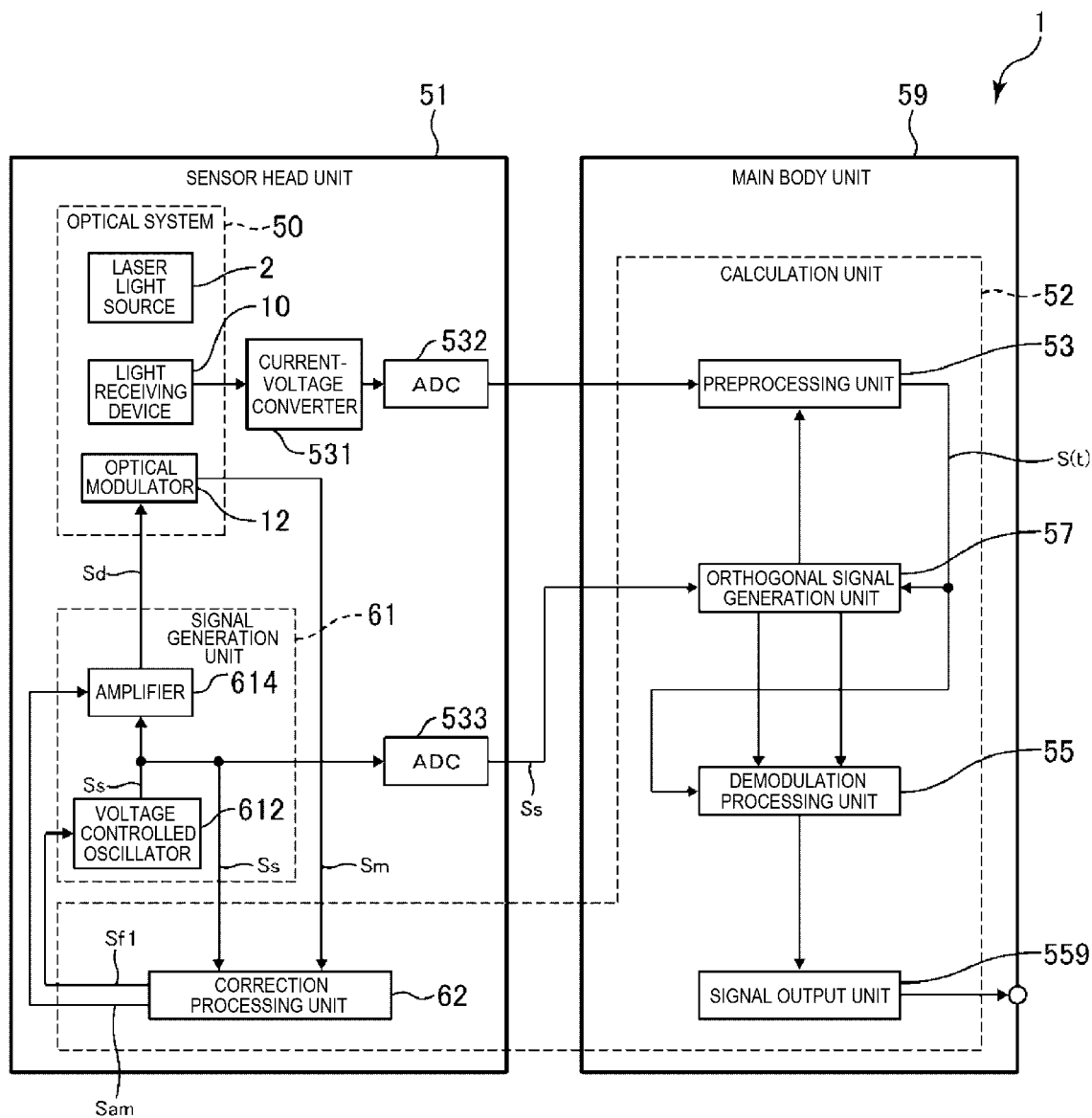
FIG. 1 is a functional block diagram showing a laser interferometer according to a first embodiment.
Figure 2:
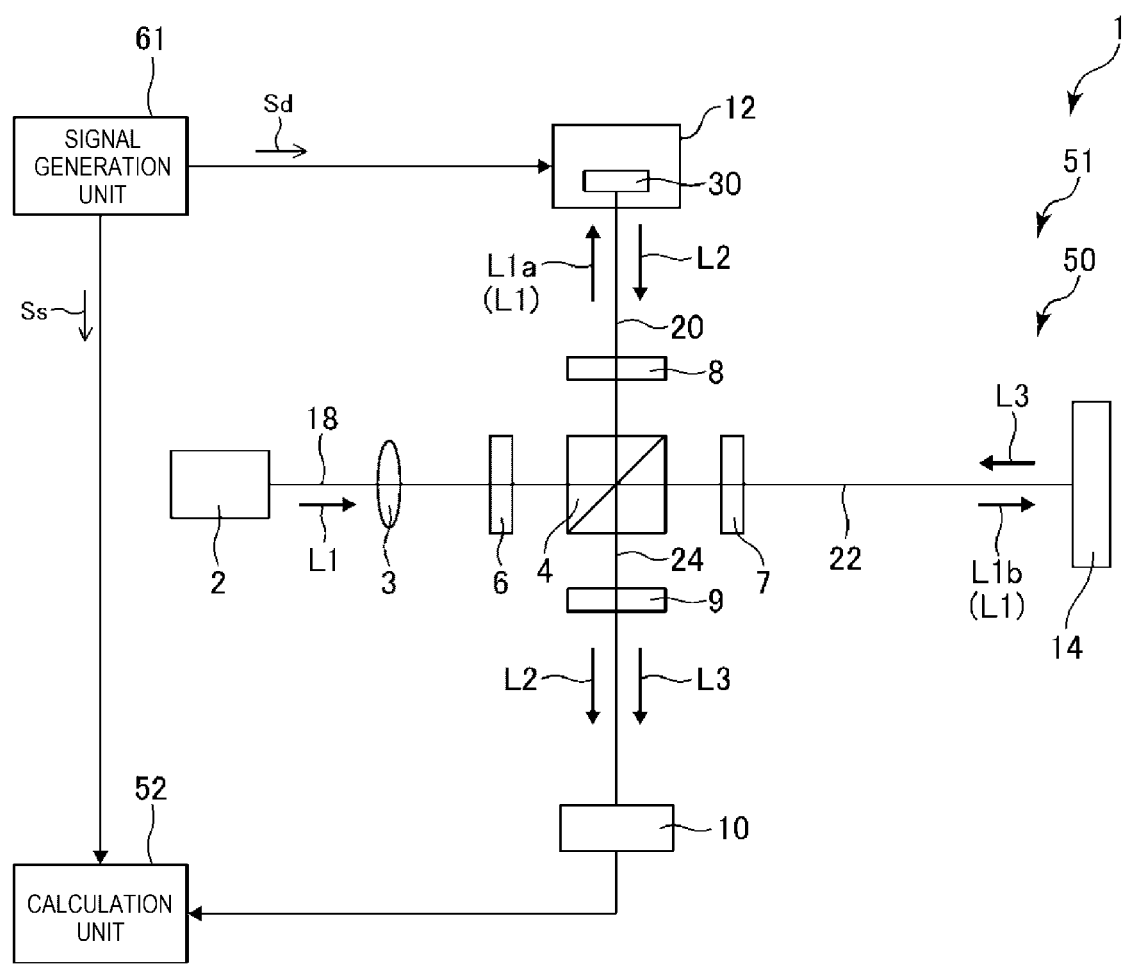
FIG. 2 is a schematic configuration diagram showing a sensor head unit in FIG. 1.

FIG. 1 is a functional block diagram showing the laser interferometer according to the first embodiment. FIG. 2 is a schematic configuration diagram showing a sensor head unit 51 in FIG. 1.

A laser interferometer 1 shown in FIG. 1 includes the sensor head unit 51 and a main body unit 59. The sensor head unit 51 can be easily reduced in size and weight, and is portable and easy to install. Therefore, the sensor head unit 51 can be disposed near, for example, an object 14 shown in FIG. 2, which is an object to be measured by the laser interferometer 1. The main body unit 59 can be disposed away from the sensor head unit 51, and may be accommodated in, for example, a rack.

1.1. Sensor Head Unit

The sensor head unit 51 shown in FIG. 1 includes an optical system 50, a current-voltage converter 531, a signal generation unit 61, and a correction processing unit 62. The main body unit 59 shown in FIG. 1 includes a preprocessing unit 53, an orthogonal signal generation unit 57, a demodulation processing unit 55, and a signal output unit 559.

1.1.1. Optical System

As shown in FIG. 2, the optical system 50 includes a laser light source 2, a collimator lens 3, a light splitter 4, a half-wavelength plate 6, a quarter-wavelength plate 7, a quarter-wavelength plate 8, an analyzer 9, a photodetector 10, and a frequency shifter type optical modulator 12.

The laser light source 2 emits emission light L1 (laser light). The photodetector 10 converts the received light into an electric signal. The optical modulator 12 includes a vibrator 30, and changes a frequency of the emission light L1 to generate reference light L2 including a modulation signal (laser light including a modulation signal). The emission light L1 incident on the object 14 is reflected as object light L3 including a sample signal which is a Doppler signal derived from the object 14 (laser light including a sample signal).

An optical path coupling the light splitter 4 and the laser light source 2 is referred to as an optical path 18. An optical path coupling the light splitter 4 and the optical modulator 12 is referred to as an optical path 20. An optical path coupling the light splitter 4 and the object 14 is referred to as an optical path 22. An optical path coupling the light splitter 4 and the photodetector 10 is referred to as an optical path 24. The "optical path" in the present specification refers to a path which is set between optical components and through which light travels.

On the optical path 18, the half-wavelength plate 6 and the collimator lens 3 are disposed in this order from a light splitter 4 side. The quarter-wavelength plate 8 is disposed on the optical path 20. The quarter-wavelength plate 7 is disposed on the optical path 22. The analyzer 9 is disposed on the optical path 24.

The emission light L1 emitted from the laser light source 2 passes through the optical path 18 and is split into two by the light splitter 4. First split light L1a, which is one beam of the split emission light L1, is incident on the optical modulator 12 through the optical path 20. Second split light L1b, which is the other beam of the split emission light L1, is incident on the object 14 through the optical path 22. The reference light L2, which is generated by the optical modulator 12 modulating the frequency of the emission light L1, is incident on the photodetector 10 through the optical path 20 and the optical path 24. The object light L3 generated by the reflection on the object 14 is incident on the photodetector 10 through the optical path 22 and the optical path 24.

Hereinafter, each unit of the optical system 50 will be further described.

1.1.1.1. Laser Light Source

The laser light source 2 is a laser light source that emits the emission light L1 having coherence. A light source having a line width of a band of MHz or less may be used as the laser light source 2. Specific examples thereof include a gas laser such as a He—Ne laser, and a semiconductor laser device such as a distributed feedback-laser diode (DFB-LD), a fiber Bragg grating laser diode (FBG-LD), a vertical cavity surface emitting laser (VCSEL) diode, and a Fabry-Perot laser diode (FP-LD).

In particular, the laser light source 2 is preferably a semiconductor laser device. Accordingly, it is possible to reduce a size of the laser light source 2 in particular. Therefore, it is possible to reduce a size of the laser interferometer 1. In particular, in the laser interferometer 1, since the sensor head unit 51 in which the optical system 50 is accommodated is reduced in size and weight, it is useful in that operability of the laser interferometer 1, such as a degree of installation freedom of the sensor head unit 51, is enhanced.

1.1.1.2. Collimator Lens

The collimator lens 3 is an optical device disposed between the laser light source 2 and the light splitter 4. An example thereof includes an aspherical lens. The collimator lens 3 collimates the emission light L1 emitted from the laser light source 2. When the emission light L1 emitted from the laser light source 2 is sufficiently collimated, for example, when a gas laser such as a He—Ne laser is used as the laser light source 2, the collimator lens 3 may be omitted.

On the other hand, when the laser light source 2 is a semiconductor laser device, the laser interferometer 1 preferably includes the collimator lens 3 disposed between the laser light source 2 and the light splitter 4. Accordingly, the emission light L1 emitted from the semiconductor laser device can be collimated. As a result, since the emission light L1 becomes collimated light, it is possible to prevent an increase in sizes of various optical components that receive the emission light L1, and it is possible to reduce the size of the laser interferometer 1.

When the emission light L1 that became collimated light passes through the half-wavelength plate 6, the emission light L1 is converted into linearly polarized light having an intensity ratio of P-polarized light to S-polarized light of, for example, 50:50, and is incident on the light splitter 4.

1.1.1.3. Light Splitter

The light splitter 4 is a polarization beam splitter disposed between the laser light source 2 and the optical modulator 12 and between the laser light source 2 and the object 14. The light splitter 4 has a function of transmitting P-polarized light and reflecting S-polarized light. With such a function, the light splitter 4 splits the emission light L1 into the first split light L1*a* that is light reflected by the light splitter 4, and the second split light L1*b* that is light transmitted through the light splitter 4.

The first split light L1*a*, which is S-polarized light reflected by the light splitter 4, is converted into circularly polarized light by the quarter-wavelength plate 8, and is incident on the optical modulator 12. The first split light L1*a* incident on the optical modulator 12 is subjected to a frequency shift of $f_m$ [Hz] and is reflected as the reference light L2. Therefore, the reference light L2 includes a modulation signal having a frequency $f_m$ [Hz]. The reference light L2 is converted into P-polarized light when the reference light L2 transmits through the quarter-wavelength plate 8 again. The P-polarized light of the reference light L2 transmits through the light splitter 4 and the analyzer 9 and is incident on the photodetector 10.

The second split light L1*b*, which is P-polarized light transmitted through the light splitter 4, is converted into circularly polarized light by the quarter-wavelength plate 7, and is incident on the object 14 in a moving state. The second split light L1*b* incident on the object 14 is subjected to a Doppler shift of $f_d$ [Hz] and is reflected as the object light L3. Therefore, the object light L3 includes a sample signal having a frequency $f_d$ [Hz]. The object light L3 is converted into S-polarized light when the object light L3 transmits through the quarter-wavelength plate 7 again. The S-polarized light of the object light L3 is reflected by the light splitter 4, transmits through the analyzer 9, and is incident on the photodetector 10.

As described above, since the emission light L1 has coherence, the reference light L2 and the object light L3 are incident on the photodetector 10 as interference light.

A non-polarization beam splitter may be used instead of the polarization beam splitter. In this case, since the half-wavelength plate 6, the quarter-wavelength plate 7, the quarter-wavelength plate 8, and the like are not necessary, it is possible to reduce the size of the laser interferometer 1 by reducing the number of components. In addition, a light splitter other than the beam splitter may be used.

1.1.1.4. Analyzer

Since the S-polarized light and the P-polarized light orthogonal to each other are independent of each other, a beat due to interference does not appear only by simply superimposing the S-polarized light and the P-polarized light. Therefore, light waves obtained by superimposing the S-polarized light and the P-polarized light transmit through the analyzer 9 inclined by 45° with respect to both the S-polarized light and the P-polarized light. By using the analyzer 9, it is possible to transmit light having common components and cause the interference. As a result, in the analyzer 9, the reference light L2 and the object light L3 interfere with each other, and interference light having a frequency $|f_m - f_d|$ [Hz] is generated.

1.1.1.5. Photodetector

When the interference light is incident on the photodetector 10, the photodetector 10 outputs a photocurrent (light receiving signal) corresponding to an intensity of the interference light. By demodulating a sample signal from the light receiving signal by a method to be described later, it is possible to finally obtain a movement, that is, a displacement and a velocity of the object 14. Examples of the photodetector 10 include a photodiode. The light received by the photodetector 10 is not limited to the interference light described above as long as the light includes the sample signal and the modulation signal. In the present specification, "demodulating a sample signal from a light receiving signal" includes demodulating a sample signal from various signals converted from a photocurrent (light receiving signal).

1.1.1.6. Optical Modulator

Figure 3:
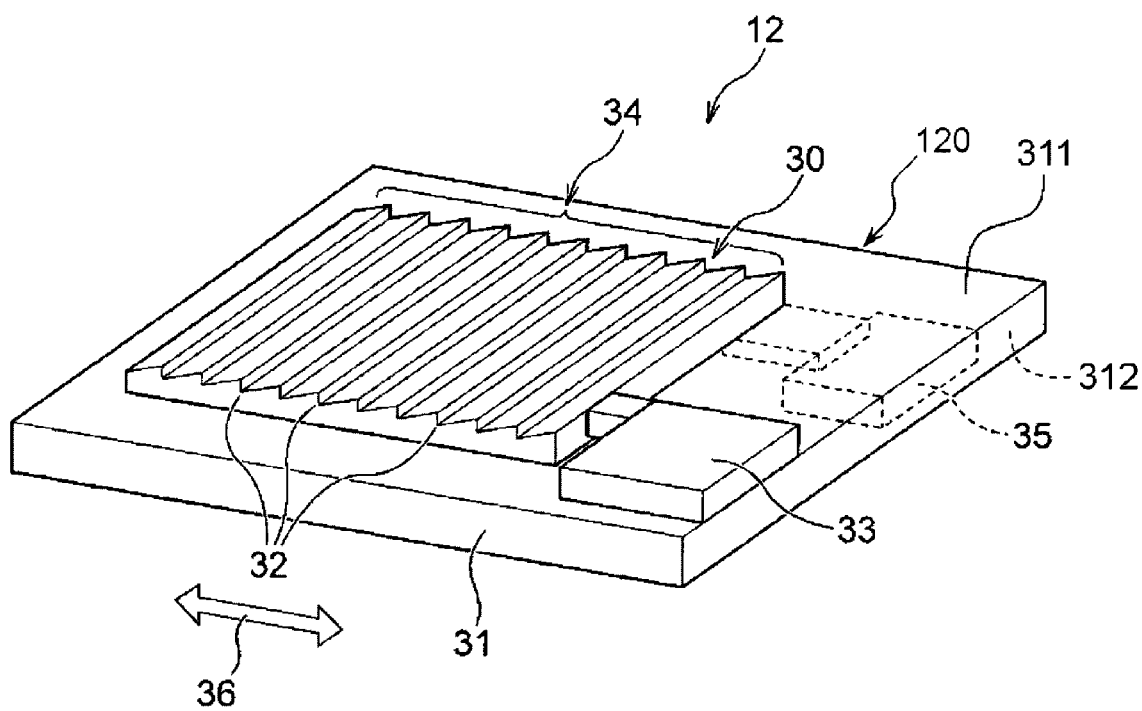
FIG. 3 is a perspective view showing a first configuration example of an optical modulator in FIG. 2.

FIG. 3 is a perspective view showing a first configuration example of the optical modulator 12 in FIG. 2.

1.1.1.6.1. Overview of First Configuration Example of Optical Modulator

The frequency shifter type optical modulator 12 includes an optical modulation resonator 120. The optical modulation resonator 120 shown in FIG. 3 includes a plate-shaped vibrator 30 and a substrate 31 that supports the vibrator 30.

The vibrator 30 is formed of a material that repeats a mode in which the vibrator 30 vibrates so as to be distorted in a direction along a surface by applying a potential. In the configuration example, the vibrator 30 is a quartz crystal AT resonator that performs a thickness-shear vibration along a vibration direction 36 in a high frequency region of a MHz band. A diffraction grating 34 is formed on a surface of the vibrator 30. The diffraction grating 34 includes a plurality of grooves 32 having a component intersecting the vibration direction 36, that is, a plurality of linear grooves 32 extending in a direction intersecting the vibration direction 36.

The substrate 31 has a front surface 311 and a back surface 312 having a front and back relationship relative to each other. The vibrator 30 is disposed on the front surface 311. A pad 33 for applying a potential to the vibrator 30 is provided on the front surface 311. On the other hand, a pad 35 for applying a potential to the vibrator 30 is provided on the back surface 312.

A long side of the substrate 31 is, for example, about 0.5 mm or more and 10.0 mm or less. A thickness of the substrate 31 is, for example, about 0.10 mm or more and 2.0 mm or less. As an example, a shape of the substrate 31 is a square having a side of 1.6 mm and a thickness of 0.35 mm.

A long side of the vibrator 30 is, for example, about 0.2 mm or more and 3.0 mm or less. A thickness of the vibrator 30 is, for example, about 0.003 mm or more and 0.5 mm or less.

As an example, a shape of the vibrator 30 is a square having a side of 1.0 mm and a thickness of 0.07 mm. In this case, the vibrator 30 oscillates at a basic oscillation frequency of 24 MHz. The oscillation frequency can be adjusted in a range of 1 MHz to 1 GHz by changing the thickness of the vibrator 30 or considering an overtone.

Although the diffraction grating 34 is formed on the entire surface of the vibrator 30 in FIG. 3, the diffraction grating 34 may be formed only on a part of the surface of the vibrator 30.

A magnitude of the optical modulation by the optical modulator 12 is given by an inner product of a difference wavenumber vector between a wavenumber vector of the emission light L1 that is incident on the optical modulator 12 and a wavenumber vector of the reference light L2 emitted from the optical modulator 12 and a vector of the vibrator 30 in the vibration direction 36. In the configuration example, the vibrator 30 performs the thickness-shear vibration, but since this vibration is in-plane vibration, even when light is incident perpendicularly to the front surface of the vibrator 30 alone, the optical modulation cannot be performed. Therefore, in the configuration example, by providing the diffraction grating 34 on the vibrator 30, the optical modulation can be performed according to a principle to be described later.

The diffraction grating 34 shown in FIG. 3 is a blazed diffraction grating. The blazed diffraction grating refers to a diffraction grating having a stepwise cross-sectional shape. The linear grooves 32 of the diffraction grating 34 are provided such that an extending direction thereof is orthogonal to the vibration direction 36.

When a drive signal Sd is supplied (an alternating current voltage is applied) from the signal generation unit 61 shown in FIGS. 1 and 2 to the vibrator 30 shown in FIG. 3, the vibrator 30 oscillates. Power (driving power) required for the oscillation of the vibrator 30 is not particularly limited, and is as small as about 0.1 µW to 100 mW. Therefore, it is possible to easily reduce the size and weight of the sensor head unit 51.

Since an optical modulator in the related art may require a structure for maintaining a temperature of the optical modulator, it is difficult to reduce a volume of the optical modulator. On the other hand, in the configuration example, since a structure for maintaining the temperature is not necessary, the volume of the vibrator 30 is very small. Therefore, also from this viewpoint, it is easy to reduce the size and power consumption of the laser interferometer 1.

1.1.1.6.2. Method for Forming Diffraction Grating

A method for forming the diffraction grating 34 is not particularly limited, and examples thereof include a method in which a mold is formed by a mechanical wire type (routing engine) method, and the grooves 32 are formed on an electrode formed on the surface of the vibrator 30 of the quartz crystal AT resonator using a nanoimprinting method. Here, a reason why the grooves 32 are formed on the electrode is that a high-quality thickness shear vibration can be caused on the electrode in principle in the case of the quartz crystal AT resonator. The grooves 32 are not limited to being formed on the electrode, and may be formed on a front surface of a material of a non-electrode portion. Further, instead of the nanoimprinting method, a processing method by exposure and etching, an electron beam lithography method, a focused ion beam (FIB) processing method, or the like may be used.

The diffraction grating may be formed of a resist material on a chip of the quartz crystal AT resonator, and a metal film or a mirror film formed of a dielectric multilayer film may be provided thereon. Reflectance of the diffraction grating 34 can be increased by providing the metal film or the mirror film.

Further, a resist film may be formed on a chip or a wafer of the quartz crystal AT resonator, and processed by etching, then the resist film is removed, and thereafter a metal film or a mirror film may be formed on a surface to be processed. In this case, since the resist material is removed, an influence of moisture absorption or the like of the resist material can be eliminated, and chemical stability of the diffraction grating 34 can be enhanced. Further, a metal film having high conductivity such as Au or Al is provided, so that the metal film can also be used as an electrode for driving the vibrator 30.

The diffraction grating 34 may be formed using a technique such as anodized alumina (porous alumina).

1.1.1.6.3. Other Configuration Examples of Optical Modulator

The vibrator 30 is not limited to the quartz crystal resonator, and may be, for example, a Si resonator, a surface acoustic wave (SAW) device, and a ceramic resonator.

Figure 4:
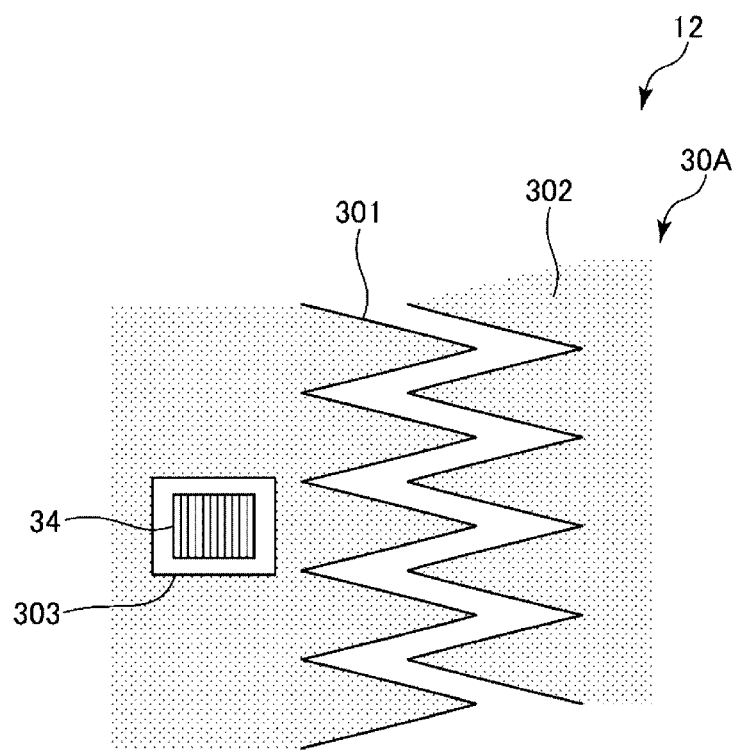
FIG. 4 is a plan view showing a part of a second configuration example of the optical modulator.
Figure 5:
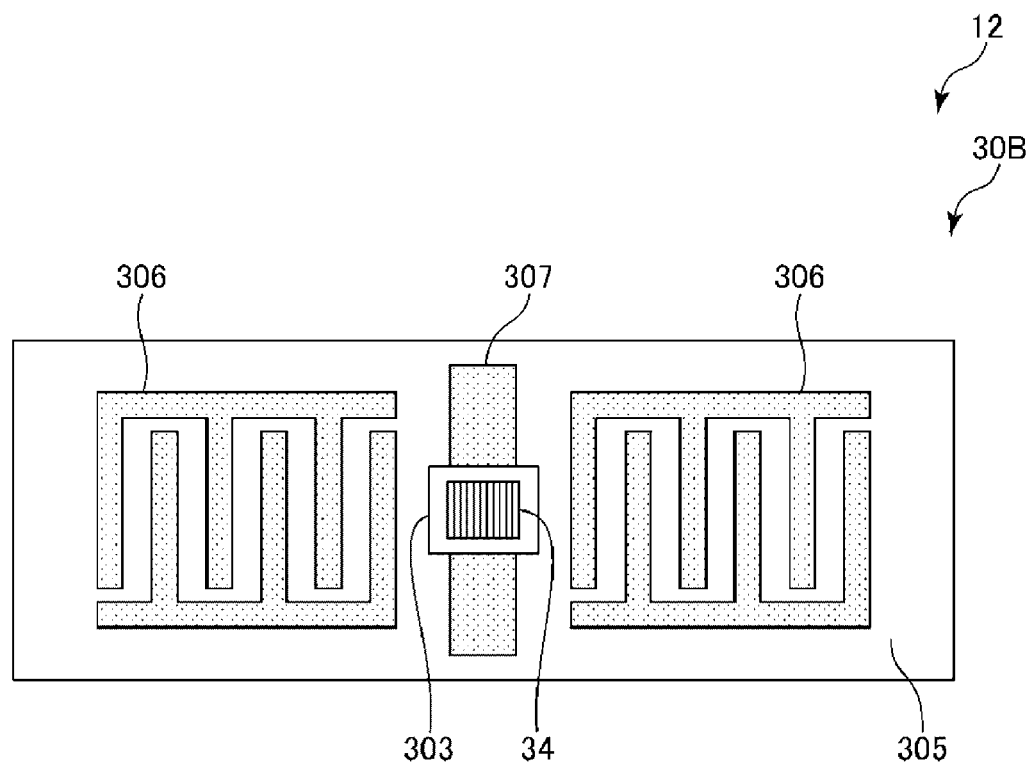
FIG. 5 is a plan view showing a third configuration example of the optical modulator.

FIG. 4 is a plan view showing a part of a second configuration example of the optical modulator 12. FIG. 5 is a plan view showing a third configuration example of the optical modulator 12.

A vibrator 30A shown in FIG. 4 is a Si resonator manufactured from a Si substrate using an MEMS technique. The MEMS refers to a micro electro mechanical system.

The vibrator 30A includes a first electrode 301 and a second electrode 302 adjacent to each other on the same plane with a gap therebetween, a diffraction grating mounting portion 303 provided on the first electrode 301, and the diffraction grating 34 provided on the diffraction grating mounting portion 303. For example, the first electrode 301 and the second electrode 302 vibrate using electrostatic attraction as a driving force so as to repeatedly approach and separate from each other in a left-right direction in FIG. 4, that is, along an axis that couples the first electrode 301 and the second electrode 302 shown in FIG. 4. Accordingly, the in-plane vibration can be applied to the diffraction grating 34. An oscillation frequency of the Si resonator is, for example, about 1 kHz to several hundred MHz.

A vibrator 30B shown in FIG. 5 is an SAW device using a surface wave. The SAW refers to a surface acoustic wave.

The vibrator 30B includes a piezoelectric substrate 305, comb-shaped electrodes 306 provided on the piezoelectric substrate 305, a ground electrode 307, the diffraction grating mounting portion 303, and the diffraction grating 34. When an alternating current voltage is applied to the comb-shaped electrodes 306, the surface acoustic wave is excited by an inverse piezoelectric effect. Accordingly, the in-plane vibration can be applied to the diffraction grating 34. An oscillation frequency of the SAW device is, for example, about several hundred MHz to several GHz.

In the device described above, it is also possible to perform optical modulation according to a principle to be described later by providing the diffraction grating 34 in a similar manner to the case of the quartz crystal AT resonator.

When the vibrator 30 is a quartz crystal resonator, a highly accurate modulation signal can be generated using an extremely high Q value of a quartz crystal. The Q value is an index indicating sharpness of a resonance peak. In addition, the quartz crystal resonator is characterized by being less likely to be influenced by disturbance. Therefore, a sample signal derived from the object 14 can be acquired with high accuracy by using a modulation signal modulated by the optical modulator 12 including the quartz crystal resonator.

1.1.1.6.4. Optical Modulation by Vibrator

Next, the principle of modulating light using the vibrator 30 will be described.

Figure 6:
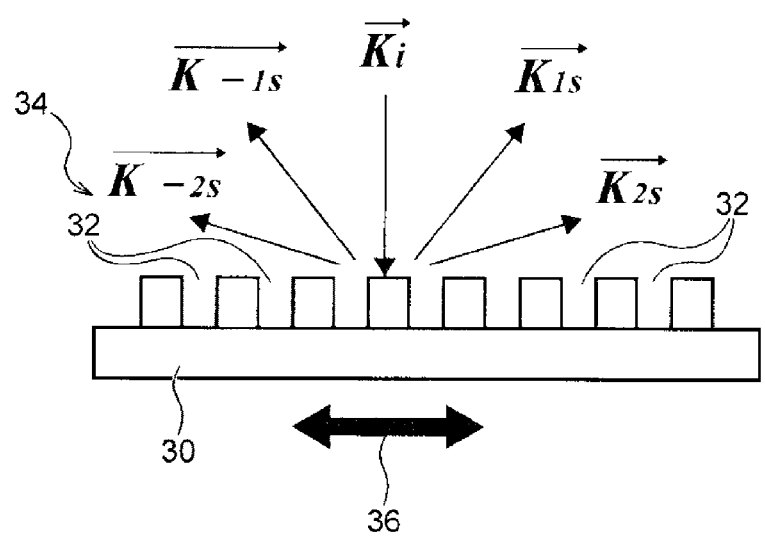
FIG. 6 is a conceptual diagram showing that a plurality of beams of diffracted light are generated when incident light $K_i$ is incident from a direction perpendicular to a surface of a vibrator.

FIG. 6 is a conceptual diagram showing that a plurality of beams of diffracted light are generated when incident light $K_i$ is incident from a direction perpendicular to the surface of the vibrator 30.

As shown in FIG. 6, when the incident light $K_i$ is incident on the diffraction grating 34 that performs the thickness-shear vibration along the vibration direction 36, a plurality of beams of diffracted light Kris are generated due to a diffraction phenomenon. n is the order of the diffracted light $K_{ns}$, and n=0, ±1, ±2, and so on. The diffraction grating 34 shown in FIG. 6 does not show the blazed diffraction grating shown in FIG. 3, and shows a diffraction grating formed by repeating projections and recesses as an example of another diffraction grating. The diffracted light $K_{0s}$ is not illustrated in FIG. 6.

Although the incident light $K_i$ is incident from the direction perpendicular to the surface of the vibrator 30 in FIG. 6, and an incident angle thereof is not particularly limited. Alternatively, the incident angle may be set such that the incident light $K_i$ is obliquely incident on the surface of the vibrator 30. When the incident light $K_i$ is obliquely incident thereon, the traveling direction of the diffracted light $K_{ns}$ changes accordingly.

Depending on a design of the diffraction grating 34, high-order light of |n|≥2 may not appear. Therefore, it is desirable to set |n|=1 in order to stably obtain the modulation signal. That is, in the laser interferometer 1 in FIG. 2, the frequency shifter type optical modulator 12 may be disposed such that ±1st order diffracted light is used as the reference light L2. With this arrangement, measurement by the laser interferometer 1 can be stabilized.

On the other hand, when the high-order light of |n|≥2 appears from the diffraction grating 34, the optical modulator 12 may be disposed such that any diffracted light of ±2nd order or higher order is used as the reference light L2 instead of the ±1st order diffracted light. Accordingly, the laser interferometer 1 can be made higher in frequency and smaller in size because the high-order diffracted light can be used.

In the embodiment, for example, the optical modulator 12 is configured such that an angle formed by an entering direction of the incident light $K_i$ that is incident on the optical modulator 12 and a traveling direction of the reference light L2 emitted from the optical modulator 12 is 180°. Hereinafter, three examples will be described with reference to FIGS. 7 to 9.

Figure 7:
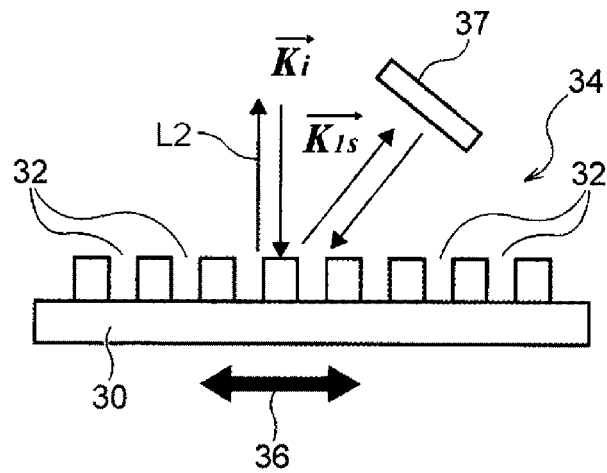
FIG. 7 is a conceptual diagram showing the optical modulator configured such that an angle formed by a traveling direction of the incident light $K_i$ and a traveling direction of reference light L2 is 180°.
Figure 8:
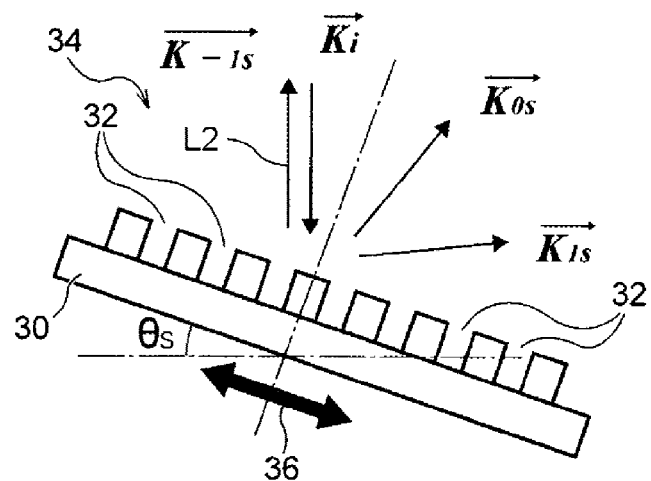
FIG. 8 is a conceptual diagram showing the optical modulator configured such that the angle formed by the traveling direction of the incident light $K_i$ and the traveling direction of the reference light L2 is 180°.
Figure 9:
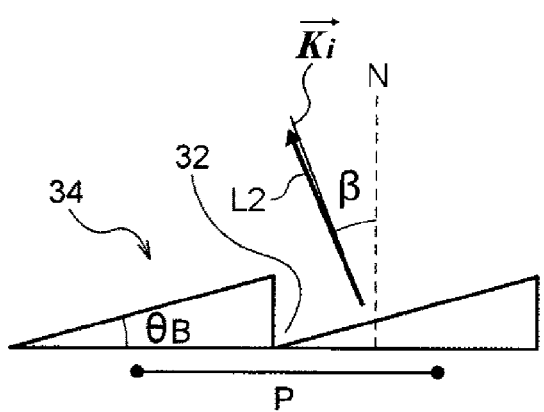
FIG. 9 is a conceptual diagram showing the optical modulator configured such that the angle formed by the traveling direction of the incident light $K_i$ and the traveling direction of the reference light L2 is 180°.

FIGS. 7 to 9 are conceptual diagrams showing the optical modulator 12 configured such that the angle formed by the traveling direction of the incident light $K_i$ and the traveling direction of the reference light L2 is 180°.

The optical modulator 12 shown in FIG. 7 includes a mirror 37 in addition to the vibrator 30. The mirror 37 is disposed so as to reflect the diffracted light $K_{1s}$ and return the diffracted light $K_{1s}$ to the diffraction grating 34. At this time, an angle formed by an incident angle of the diffracted light $K_{1s}$ with respect to the mirror 37 and a reflection angle of the diffracted light $K_{1s}$ reflected by the mirror 37 is 180°. As a result, the diffracted light $K_{1s}$ emitted from the mirror 37 and returned to the diffraction grating 34 is diffracted again by the diffraction grating 34 and travels in a direction opposite to the traveling direction of the incident light $K_i$ that is incident on the optical modulator 12. Therefore, by adding the mirror 37, it is possible to satisfy the above-described condition that the angle formed by the entering direction of the incident light $K_i$ and the traveling direction of the reference light L2 is 180°.

Since the diffracted light $K_{1s}$ is reflected by the mirror 37 in this manner, the reference light L2 generated by the optical modulator 12 is subjected to frequency modulation twice. Therefore, as compared with a case of using the vibrator 30 alone, it is possible to perform the frequency modulation at a higher frequency by using the mirror 37 in combination.

In FIG. 8, the vibrator 30 is inclined as compared with an arrangement in FIG. 6. An inclination angle θs at this time is set so as to satisfy the above-described condition that the angle formed by the entering direction of the incident light $K_i$ and the traveling direction of the reference light L2 is 180°.

The diffraction grating 34 shown in FIG. 9 is a blazed diffraction grating having a blaze angle GB. When the incident light $K_i$ traveling at an incident angle β, with respect to a normal line N of the surface of the vibrator 30 is incident on the diffraction grating 34, the reference light L2 returns at an angle same as the blaze angle GB with respect to the normal line N. Therefore, by setting the incident angle β, equal to the blaze angle θs, it is possible to satisfy the above-described condition that the angle formed by the entering direction of the incident light $K_i$ and the traveling direction of the reference light L2 is 180°. In this case, since the above-described condition can be satisfied without using the mirror 37 shown in FIG. 7 and without inclining the vibrator 30 itself as shown in FIG. 8, it is possible to further reduce the size of the laser interferometer 1 and increase the frequency thereof. In particular, in the case of a blazed diffraction grating, an arrangement satisfying the above condition is referred to as a "Littrow arrangement", and there is also an advantage that a diffraction efficiency of diffracted light can be particularly increased.

A pitch P in FIG. 9 represents a pitch in the blazed diffraction grating, and for example, the pitch P is 1 µm. The blaze angle $\Theta_s$ is, for example, 25°. In this case, in order to satisfy the above-described condition, the incident angle β of the incident light $K_i$ with respect to the normal line N may be set to 25°.

The diffraction grating 34 may be provided as necessary. For example, when the vibrator 30 is a device that vibrates out-of-plane, efficiency of the optical modulation of the emission light L1 incident on the vibrator 30 can be increased without using the diffraction grating 34. In such a case, the diffraction grating 34 may be omitted.

In addition, the vibrator 30 is not limited to the quartz crystal resonator, and may be a silicon resonator or a ceramic resonator.

1.1.2. Current-Voltage Converter

The current-voltage converter 531 is also called a transimpedance amplifier (TIA), and converts a photocurrent (light receiving signal) output from the photodetector 10 into a voltage signal and outputs the voltage signal as a light detection signal.

An ADC 532 shown in FIG. 1 is disposed between the current-voltage converter 531 and the calculation unit 52. The ADC 532 is an analog-to-digital converter, and converts an analog signal into a digital signal with a predetermined number of sampling bits. The ADC 532 is provided in the sensor head unit 51.

The optical system 50 may include a plurality of photodetectors 10. In this case, a differential amplifier circuit is provided between the plurality of photodetectors 10 and the current-voltage converter 531, so that it is possible to perform differential amplification processing on a photocurrent and increase an S/N ratio (signal-to-noise ratio) of a light detection signal. The differential amplification processing may be performed on the voltage signal.

1.1.3. Signal Generation Unit

The signal generation unit 61 outputs the drive signal Sd to the optical modulator 12. In addition, the signal generation unit 61 outputs the reference signal Ss to the calculation unit 52.

As shown in FIG. 1, the signal generation unit 61 includes a voltage controlled oscillator 612 and an amplifier 614.

The voltage controlled oscillator 612 is a voltage controlled oscillator (VCO), and has a function of controlling, based on a received voltage signal, a frequency of a periodic signal to be output. Accordingly, the voltage controlled oscillator 612 generates the reference signal Ss having a target frequency, and outputs the reference signal Ss to the amplifier 614 and the calculation unit 52. The voltage controlled oscillator 612 is not limited to the VCO as long as it is an oscillator capable of adjusting the frequency of the periodic signal to be output.

The amplifier 614 has a function of controlling, based on a received control signal, an amplitude of the periodic signal to be output. Accordingly, the amplifier 614 amplifies the received reference signal Ss, generates a drive signal Sd having a target amplitude, and outputs the drive signal Sd to the optical modulator 12.

1.2. Calculation Unit

Figure 10:
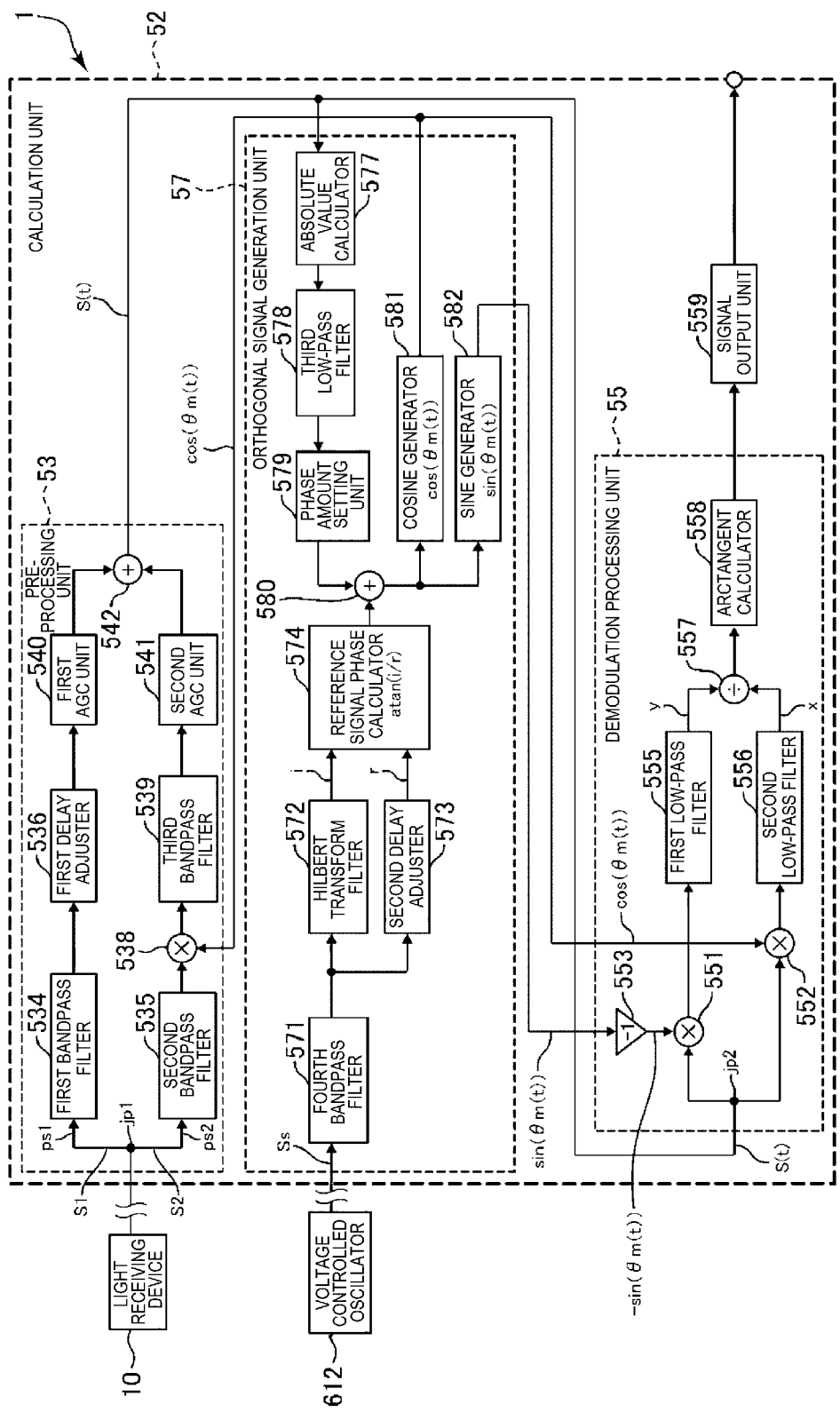
FIG. 10 is a diagram showing details of a calculation unit in the functional block diagram in FIG. 1.

FIG. 10 is a diagram showing details of the calculation unit 52 in the functional block diagram in FIG. 1.

The calculation unit 52 shown in FIG. 1 includes the preprocessing unit 53, the orthogonal signal generation unit 57, the demodulation processing unit 55, the signal output unit 559, and the correction processing unit 62.

The calculation unit 52 performs demodulation processing of demodulating a sample signal that is derived from the object 14 from a light detection signal output from the current-voltage converter 531. The sample signal includes, for example, phase information and frequency information. The displacement of the object 14 can be acquired from the phase information, and the velocity of the object 14 can be acquired from the frequency information. When different physical quantities can be acquired in this way, the laser interferometer 1 functions as a displacement meter or a velocimeter, so that the laser interferometer 1 can be made highly functional.

A circuit configuration of the calculation unit 52 is set in accordance with a modulation processing method. In the laser interferometer 1 according to the embodiment, the optical modulator 12 including the vibrator 30 is used. Since the vibrator 30 is a device that vibrates in a simple harmonic motion, a vibration velocity changes every moment in a period. Therefore, a modulation frequency also changes with time, and a demodulation circuit in the related art cannot be used as it is.

The demodulation circuit in the related art refers to, for example, a circuit that demodulates a sample signal from a light detection signal including a modulation signal modulated using an acousto-optic modulator (AOM). In the acousto-optic modulator, the modulation frequency does not change with time unless there is an influence of disturbance such as a temperature change. Therefore, the demodulation circuit in the related art can demodulate a sample signal from a light detection signal including a modulation signal whose modulation frequency does not change, but cannot demodulate a sample signal including a modulation signal modulated by the optical modulator 12 in which a modulation frequency changes (periodically) with time.

Therefore, as described above, the calculation unit 52 shown in FIG. 1 includes the preprocessing unit 53, the orthogonal signal generation unit 57, the demodulation processing unit 55, the signal output unit 559, and the correction processing unit 62. A light detection signal output from the current-voltage converter 531 first passes through the preprocessing unit 53, and is then guided to the demodulation processing unit 55. By the preprocessing, processing of extracting a frequency modulation component from a light detection signal is performed, and a signal that can be demodulated by a demodulation circuit in the related art is acquired. Therefore, the demodulation processing unit 55 demodulates the sample signal derived from the object 14 by a known demodulation method. As shown in FIG. 10, the orthogonal signal generation unit 57 generates a cosine wave signal $\cos(\theta_m(t))$ and a sine wave signal $\sin(\theta_m(t))$, which are orthogonal signals, based on the reference signal Ss output from the signal generation unit 61 and the preprocessing signal S(t) output from the preprocessing unit 53.

The above-described functions of the calculation unit 52 are implemented by, for example, hardware including a processor, a memory, an external interface, an input unit, a display unit, and the like. Specifically, the processor reads and executes a program stored in the memory, thereby implementing the functions. These components can communicate with each other via an internal bus.

Examples of the processor include a central processing unit (CPU) and a digital signal processor (DSP). Instead of the method in which the processor executes software, a method in which a field-programmable gate array (FPGA), an application specific integrated circuit (ASIC), or the like implements the above-described functions may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input/output port such as a universal serial bus (USB), and an Ethernet (registered trademark) port.

Examples of the input unit include various input devices such as a keyboard, a mouse, a touch panel, and a touch pad. Examples of the display unit include a liquid crystal display panel and an organic electro luminescence (EL) display panel.

1.2.1. Configuration of Preprocessing Unit

The preprocessing unit 53 shown in FIG. 10 includes a first bandpass filter 534, a second bandpass filter 535, a first delay adjuster 536, a multiplier 538, a third bandpass filter 539, a first AGC unit 540, a second AGC unit 541, and an adder 542. The AGC refers to auto gain control.

The light detection signal output from the current-voltage converter 531 is split at a branch portion jp1 into two signals, that is, a first signal S1 and a second signal S2. In FIG. 10, a path of the first signal S1 is referred to as a first signal path ps1, and a path of the second signal S2 is referred to as a second signal path ps2.

Each of the first bandpass filter 534, the second bandpass filter 535, and the third bandpass filter 539 is a filter that selectively transmits a signal in a specific frequency band.

The first delay adjuster 536 is a circuit that adjusts a delay of a signal using a memory that temporarily stores the signal. The multiplier 538 is a circuit that generates an output signal that is proportional to a product of two input signals. The adder 542 is a circuit that generates an output signal that is proportional to a sum of two input signals.

Next, an operation of the preprocessing unit 53 will be described along a flow of the first signal S1 and the second signal S2.

A group delay of the first signal S1 is adjusted by the first delay adjuster 536 after the first signal S1 passes through the first bandpass filter 534 disposed on the first signal path ps1. The group delay to be adjusted by the first delay adjuster 536 corresponds to a group delay of the second signal S2 caused by the second bandpass filter 535 to be described later. With such a delay adjustment, delay times caused by passing through filter circuits, that is, a delay time of the first signal S1 passing through the first bandpass filter 534 and a delay time of the second signal S2 passing through the second bandpass filter 535 and the third bandpass filter 539, can be made uniform. The first signal S1 after passing through the first delay adjuster 536 passes through the first AGC unit 540 and is input to the adder 542.

The second signal S2 is input to the multiplier 538 after passing through the second bandpass filter 535 disposed on the second signal path ps2. The multiplier 538 multiplies the second signal S2 by the cosine wave signal $\cos(\theta_m(t))$ output from the orthogonal signal generation unit 57. Thereafter, the second signal S2 passes through the third bandpass filter 539, then passes through the second AGC unit 541, and is input to the adder 542.

The adder 542 outputs a signal that is proportional to a sum of the first signal S1 and the second signal S2.

1.2.2. Preprocessing

Next, the preprocessing in the preprocessing unit 53 will be described. The preprocessing refers to processing of extracting a frequency modulation component from a light detection signal. In the following description, as an example, a system in which a frequency changes sinusoidally as a modulation signal and the displacement of the object 14 also changes in an optical axis direction with simple vibration will be considered. Here, $E_m$, $E_d$, and $\varphi$ are expressed as follows.

$$E_m = a_m\{\cos(\omega_0 t + B \sin \omega_m t + \phi_m) + i \sin(\omega_0 t + B \sin \omega_m t + \phi_m)\} \quad (1)$$

$$E_d = a_d\{\cos(\omega_0 t + A \sin \omega_d t + \phi_d) + i \sin(\omega_0 t + A \sin \omega_d t + \phi_d)\} \quad (2)$$

$$\phi = \phi_m - \phi_d \quad (3)$$

A light detection signal $I_{PD}$ output from the current-voltage converter 531 is theoretically expressed by the following formula.

$$I_{PD} = \langle |E_m + E_d|^2 \rangle \quad (4)$$
$$= \langle |E_m^2 + E_d^2 + 2E_m E_d| \rangle$$
$$= a_m^2 + a_d^2 + 2a_m a_d \cos(B\sin\omega_m t - A\sin\omega_d t + \phi)$$

$E_m$, $E_d$, $\varphi_m$, $\varphi_d$, $\varphi$, $\omega_m$, $\omega_d$, $\omega_0$, $a_m$, and $a_d$ are as follows, respectively.

$E_m$: electric field component of modulation signal derived from optical modulator
$E_d$: electric field component of sample signal derived from object to be measured
$\varphi_m$: initial phase of modulation signal derived from optical modulator
$\varphi_d$: initial phase of sample signal derived from object to be measured
$\varphi$: optical path phase difference of laser interferometer
$\omega_m$: angular frequency of modulation signal derived from optical modulator
$\omega_d$: angular frequency of sample signal derived from object to be measured
$\omega_0$: angular frequency of emission light emitted from light source
$a_m$: coefficient
$a_d$: coefficient In addition, < > in the formula (4) represents a time average.

In the above formula (4), the first term and the second term represent a direct current component, and the third term represents an alternating current component. When the alternating current component is defined as $I_{PD\cdot AC}$, $I_{PD\cdot AC}$ is represented by the following formula.

$$I_{PD\cdot AC} = 2a_m a_d \cos(B\sin\omega_m t - A\sin\omega_d t + \phi) \quad (5)$$
$$= 2a_m a_d\{\cos(B\sin\omega_m t)\cos(A\sin\omega_d t - \phi) + \sin(B\sin\omega_m t)\sin(A\sin\omega_d t - \phi)\}$$

$$A = \frac{f_{dmax}}{f_d} \quad (6)$$

$$B = \frac{f_{mmax}}{f_m} \quad (7)$$

A: phase shift of sample signal
$f_{dmax}$: Doppler frequency shift of sample signal
$f_d$: frequency of sample signal
B: phase shift of modulation signal
$f_{mmax}$: Doppler frequency shift of modulation signal
$f_m$: frequency of modulation signal Here, ν-order Bessel functions such as the following formulae (8) and (9) are known.

$$\cos\{\zeta \sin(2\pi f_v t)\} = J_0(\zeta) + 2J_2(\zeta)\cos(2\cdot 2\pi f_v t) + 2J_4(\zeta)\cos(4\cdot 2\pi f_v t) + \ldots \quad (8)$$

$$\sin\{\zeta \sin(2\pi f_v t)\} = 2J_1 \sin(1\cdot 2\pi f_v t) + 2J_3(\zeta)\sin(3\cdot 2\pi f_v t + \ldots \quad (9)$$

When the above formula (5) is subjected to series expansion using the Bessel functions of the above formulae (8) and (9), the formula (5) can be transformed into the following formula (10).

$$I_{PD\cdot AC} = 2a_m a_d [\{J_0(B) + 2J_2(B)\cos(2\cdot\omega_m t) + 2J_4(B)\cos(4\cdot\omega_m t) + \ldots\}\cos(A \sin \omega_d t - \phi) - \{2J_1(B)\sin(1\cdot\omega_m t) + 2J_3(B)\sin(3\cdot\omega_m t) + \ldots\}\sin(A \sin \omega_d t - \phi)] \quad (10)$$

$J_0(B)$, $J_1(B)$, $J_2(B)$, and . . . are Bessel coefficients.

When transformation is performed as described above, theoretically, it can be said that a band corresponding to a specific order can be extracted by a bandpass filter.

Therefore, in the preprocessing unit 53 described above, the preprocessing is performed on an alternating current component of a light detection signal in the following flow based on this theory.

First, an amplitude of an alternating current component of the light detection signal output from the current-voltage converter 531 is normalized by the ADC 532. A signal after passing through the ADC 532 is expressed by the following formula (10-1).

$$I_{ADC\_beat} = \{J_0(B) + 2J_2(B)\cos(2\omega_m t) + 2J_4(B)\cos(4\omega_m t) + \ldots\}\cos(A \sin \omega_d t - \phi) - 2\{J_0(B) + J_1(B)\sin(\omega_m t) + J_3(B)\sin(3\omega_m t) + \ldots\}\sin(A \sin \omega_d t - \phi) \quad (10\text{-}1)$$

Then, the signal after passing through the ADC 532 is split at the branch portion jp1 into two signals, that is, the first signal S1 and the second signal S2. The first signal S1 passes through the first bandpass filter 534. A center angular frequency of the first bandpass filter 534 is set to $\omega_m$. Accordingly, the first signal S1 after passing through the first bandpass filter 534 is expressed by the following formula.

$$I_{BPF1} = J_1(B)\{-\cos(\omega_m t + A\sin\omega_d t - \phi) + \cos(\omega_m t - A\sin\omega_d t + \phi)\} \quad (11)$$
$$= -2J_1(B)\sin(\omega_m t) \cdot \sin(A\sin\omega_d t - \phi)$$

Meanwhile, the second signal S2 passes through the second bandpass filter 535. A center angular frequency of the second bandpass filter 535 is set to a value different from the center angular frequency of the first bandpass filter 534. Here, for example, the center angular frequency of the second bandpass filter 535 is set to $2\omega_m$. Accordingly, the second signal S2 after passing through the second bandpass filter 535 is expressed by the following formula.

$$I_{BPF2} = 2J_2(B)\cos(2\omega_m t) \cdot \cos(A \sin \omega_d t - \phi) \quad (12)$$

The multiplier 538 multiplies the second signal S2 after passing through the second bandpass filter 535 by the cosine wave signal $\cos(\theta_m(t))$ output from the orthogonal signal generation unit 57 to be described later. The second signal S2 after passing through the multiplier 538 is expressed by the following formula.

$$I_{538} = I_{BPF2} * \cos(\theta_m(t)) \qquad (13)$$
$$= 2J_2(B)\cos(2\omega_m t) \cdot \cos(A\sin\omega_d t - \phi) \cdot \cos(\omega_m t - \alpha)$$
$$= \{J_2(B)\cos(A\sin\omega_d t - \phi)\} \cdot \{\cos(3\omega_m t - \alpha) + \cos(\omega_m t - \alpha)\}$$

In the above formula (13), $\alpha$ is a shift width, i.e., a phase difference when a phase of the reference signal Ss is shifted from an original phase. The original phase is a phase when the preprocessing signal S(t) output from the preprocessing unit 53 is a signal subject to frequency modulation only or a signal equivalent to such a signal.

The second signal S2 after passing through the multiplier 538 passes through the third bandpass filter 539. A central angular frequency of the third bandpass filter 539 is set to a value same as the central angular frequency of the first bandpass filter 534. Here, for example, the central angular frequency of the third bandpass filter 539 is set to $\omega_m$. Accordingly, the second signal S2 after passing through the third bandpass filter 539 is expressed by the following formula.

$$I_{BPF3} = J_2(B)\cos(\omega_m t + \alpha)\cos(A\sin\omega_d t - \phi) \qquad (14)$$

Thereafter, a phase of the first signal S1 expressed by the above formula (11) is adjusted by the first delay adjuster 536, and an amplitude of the first signal S1 is adjusted by the first AGC unit 540.

An amplitude of the second signal S2 expressed by the above formula (14) is adjusted by the second AGC unit 541, and the amplitude of the second signal S2 is made equal to the amplitude of the first signal S1. The first signal Si after the amplitude adjustment is expressed by the following formula (14-1), and the second signal S2 after the amplitude adjustment is expressed by the following formula (14-2).

$$I_{AGC1} = -\sin(\omega_m t) \cdot \sin(A \sin \omega_d t - \phi) \qquad (14\text{-}1)$$

$$I_{AGC2} = \cos(\omega_m t + \alpha)\cos(A \sin \omega_d t - \phi) \qquad (14\text{-}2)$$

Then, the first signal S1 and the second signal S2 are added by the adder 542. A result of the addition is the preprocessing signal S(t). The preprocessing signal S(t) is expressed by the following formula (15).

$$S(t) = I_{AGC1} + I_{AGC2} \qquad (15)$$
$$= -\sin(\omega_m t) \cdot \sin(A\sin\omega_d t - \phi) +$$
$$\cos(\omega_m t + \alpha)\cos(A\sin\omega_d t - \phi)$$

As in the above formula (15), the preprocessing signal S(t) is expressed by a formula including the phase difference $\alpha$. Therefore, when the phase difference $\alpha$ is an integral multiple of $\pi$, the above formula (15) is expressed by the following formula (15-1).

$$S(t) = -\sin(\omega_m t) \cdot \sin(A\sin\omega_d t - \phi) + \qquad (15\text{-}1)$$
$$\cos(\omega_m t)\cos(A\sin\omega_d t - \phi)$$
$$= \cos(\omega_m t + A\sin\omega_d t - \phi)$$

In the present specification, when the preprocessing signal S(t) is expressed by the above formula (15-1), it is said that "phases are aligned". On the other hand, when the preprocessing signal S(t) is expressed by the above (15) and the phase difference $\alpha$ is not an integral multiple of $\pi$, it is said that "phases are not aligned".

When phases are aligned, the preprocessing signal S(t) is expressed by the above formula (15-1), and thus it can be said that the preprocessing signal S(t) is a signal subject to frequency modulation only. Since a frequency modulation component is extracted from the preprocessing signal S(t), demodulation accuracy of a sample signal is improved in the demodulation processing unit 55. On the other hand, when phases are not aligned, it can be said that the preprocessing signal S(t) is a signal in which frequency modulation and amplitude modulation are superimposed. For such a preprocessing signal S(t), it is difficult to improve the demodulation accuracy of the sample signal in the demodulation processing unit 55.

1.2.3. Configuration of Orthogonal Signal Generation Unit

The orthogonal signal generation unit 57 shown in FIG. 10 includes a fourth bandpass filter 571, a Hilbert transform filter 572, a second delay adjuster 573 (reference signal delay device), a reference signal phase calculator 574, an absolute value calculator 577, a third low-pass filter 578, a phase amount setting unit 579, an adder 580, a cosine generator 581, and a sine generator 582.

In the embodiment, the orthogonal signal generation unit 57 generates, based on the phase of the reference signal Ss and the amplitude of the preprocessing signal S(t), the cosine wave signal $\cos(\theta_m(t))$ and the sine wave signal $\sin(\theta_m(t))$ having waveforms orthogonal to each other. In the present specification, such processing of generating an orthogonal waveform is referred to as "orthogonal waveform generation processing".

An ADC 533 shown in FIG. 1 is disposed between the signal generation unit 61 and the orthogonal signal generation unit 57. The ADC 533 is an analog-to-digital converter, and converts an analog signal into a digital signal with a predetermined number of sampling bits. The fourth bandpass filter 571 is a filter that selectively transmits a signal in a specific frequency band.

The Hilbert transform filter 572 performs Hilbert transform processing on the reference signal Ss to obtain a signal i. The reference signal Ss output from the voltage controlled oscillator 612 is expressed by $\cos(\omega_m t)$. $\omega_m$ is an angular frequency of a modulation signal modulated by the optical modulator 12, and t is a time. The Hilbert transform processing is processing of shifting a phase of the reference signal Ss by $\pi/2$.

The second delay adjuster 573 is a circuit that adjusts a delay of a signal by using a memory that temporarily stores the signal, and generates, in the reference signal Ss, a delay equivalent to a delay generated by the Hilbert transform processing. Accordingly, a signal r is obtained.

The reference signal phase calculator 574 calculates a phase of the reference signal Ss based on the signal i output from the Hilbert transform filter 572 and the signal r output from the second delay adjuster 573. Specifically, an arctangent calculation, that is, an a tan(i/r) calculation is performed on a ratio of the signal i to the signal r.

The absolute value calculator 577 calculates an absolute value of the preprocessing signal S(t) output from the preprocessing unit 53. The third low-pass filter 578 is a filter that cuts off a signal in a high frequency band for the absolute value of the preprocessing signal S(t) output from the absolute value calculator 577.

The phase amount setting unit 579 has a function of acquiring an envelope of a signal output from the third low-pass filter 578, a function of acquiring a maximum value and a minimum value of the envelope (amplitude of the envelope), and a function of outputting a phase amount a.

The adder 580 outputs a signal that is proportional to a sum of an output from the reference signal phase calculator 574 and an output from the phase amount setting unit 579. The cosine generator 581 generates a cosine wave signal $\cos(\theta_m(t))$ based on the signal output from the adder 580. The sine generator 582 generates a sine wave signal $\sin(\theta_m(t))$ based on the signal output from the adder 580.

1.2.4. Orthogonal Waveform Generation Processing

In the orthogonal waveform generation processing, first, the reference signal Ss is input to the fourth bandpass filter 571. A center angular frequency of the fourth bandpass filter 571 is set to $\omega_m$. The reference signal Ss output from the fourth bandpass filter 571 is split into two signals, one of which is input to the Hilbert transform filter 572, and the other is input to the second delay adjuster 573.

The Hilbert transform filter 572 generates the signal i by shifting a phase of the reference signal Ss by $\pi/2$. The second delay adjuster 573 delays the reference signal Ss to generate the signal r. The signal i and the signal r are input to the reference signal phase calculator 574.

The reference signal phase calculator 574 performs an a tan(i/r) calculation to acquire a phase of the reference signal Ss. The phase of the reference signal Ss is input to the adder 580.

The absolute value calculator 577 acquires an absolute value of the preprocessing signal S(t). Accordingly, a waveform at a negative side of the preprocessing signal S(t) can be converted to a waveform at a positive side and is synthesized. A signal from the absolute value calculator 577 is input to the third low-pass filter 578.

The third low-pass filter 578 cuts off a signal in a high frequency band. Accordingly, the phase amount setting unit 579 can easily acquire the envelope with high accuracy. A signal from the third low-pass filter 578 is input to the phase amount setting unit 579.

The phase amount setting unit 579 sets, based on the signal from the third low-pass filter 578, the phase amount a to be added to the calculation result a tan(i/r) by the adder 580. That is, the orthogonal signal generation unit 57 adjusts the phase of the reference signal Ss. The setting method will be described later.

The adder 580 calculates a sum of an output from the reference signal phase calculator 574 and an output from the phase amount setting unit 579. Here, the sum is β. β=a+atan(i/r). Then, the cosine generator 581 generates a cosine wave signal $\cos(\theta_m(t))$, and the sine generator 582 generates a sine wave signal $\sin(\theta_m(t))$. The cosine wave signal $\cos(\theta_m(t))$ is output to the multiplier 538 and the demodulation processing unit 55 to be described later, and the sine wave signal $\sin(\theta_m(t))$ is output to the demodulation processing unit 55. $\theta_m(t)=\omega_m t-\beta$.

1.2.5. Phase Amount Setting Method

The phase amount setting unit 579 sets the phase amount a to be added by the adder 580 such that the influence of the above-described amplitude modulation is minimized when phases are not aligned. Accordingly, the cosine generator 581 generates the cosine wave signal $\cos(\theta_m(t))$ and the sine generator 582 generates the sine wave signal $\sin(\theta_m(t))$ based on the phase amount a. Then, the cosine wave signal $\cos(\theta_m(t))$ is reflected in the preprocessing signal S(t) via the multiplier 538, and the influence of the amplitude modulation on the preprocessing signal S(t) is reduced. Finally, phases can be aligned. When the cosine wave signal $\cos(\theta_m(t))$ and the sine wave signal $\sin(\theta_m(t))$ in a case where phases are aligned are input to the demodulation processing unit 55, demodulation processing from the preprocessing signal S(t) can be performed with high accuracy.

Figure 11:
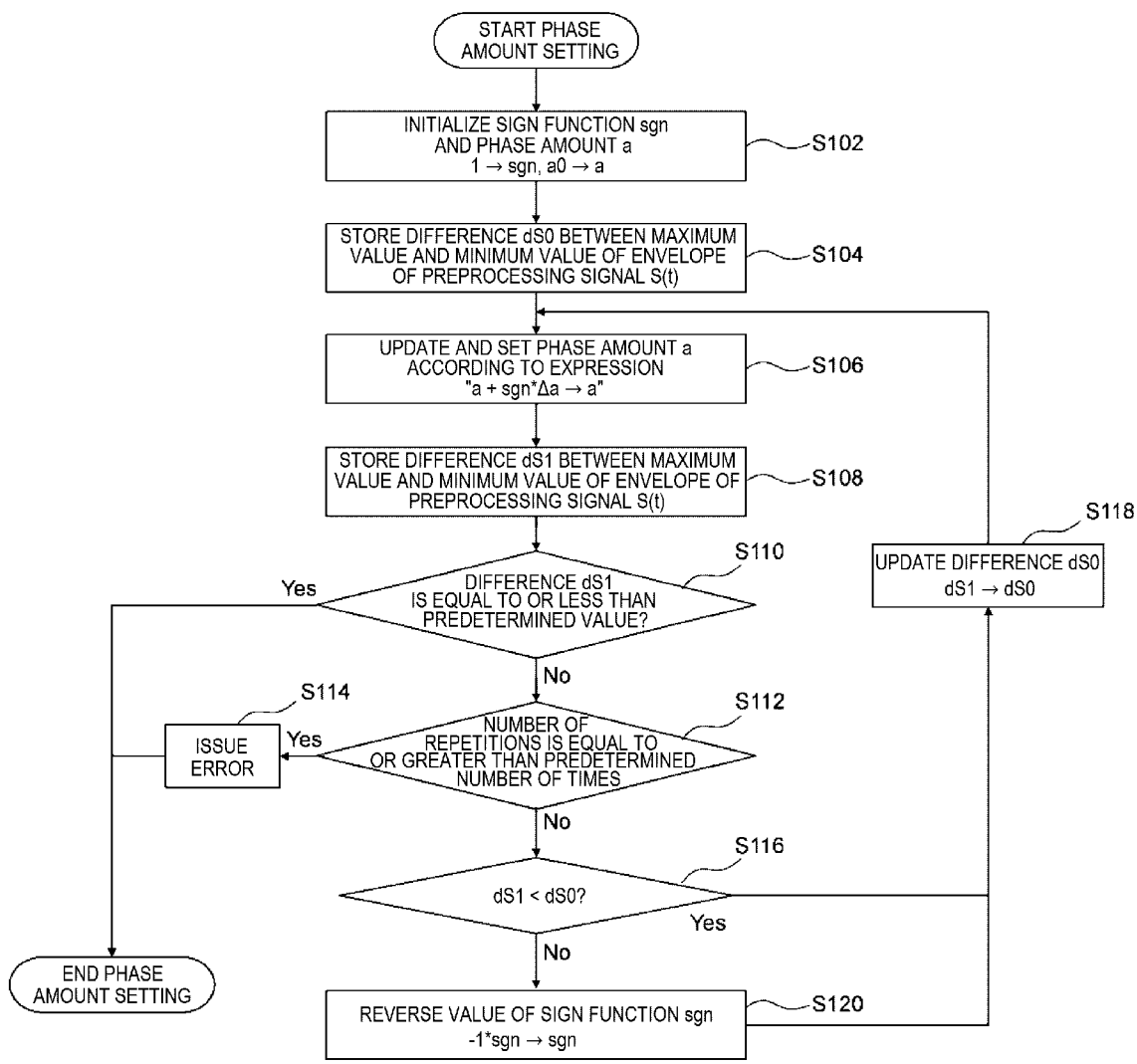
FIG. 11 is a flowchart showing an example of a method for a phase amount setting unit shown in FIG. 10 to set a phase amount.

FIG. 11 is a flowchart showing an example of a method for the phase amount setting unit 579 shown in FIG. 10 to set a phase amount. The phase amount setting shown in FIG. 11 is preferably performed using, as the object 14, a standard sample that vibrates at a single frequency. Accordingly, the phase amount setting unit 579 can more accurately obtain the phase amount a to be added by the adder 580. In the phase amount setting method shown in FIG. 11, an amplitude of the preprocessing signal S(t) is repeatedly evaluated while gradually changing a value of the phase amount a. Then, the phase amount a when the amplitude is equal to or less than a predetermined value is stored as an optimum value in the memory. After the optimum phase amount a is obtained, the phase amount a may be fixed.

Therefore, the phase amount setting method shown in FIG. 11 is performed using the above-described standard sample, for example, before the laser interferometer 1 measures the object 14. Accordingly, the laser interferometer 1 can be automatically calibrated. Examples of the standard sample include a piezoelectric device and a quartz crystal resonator.

In step S102 shown in FIG. 11, first, a sign function sgn and the phase amount a are initialized. Specifically, a value 1 is input to the sign function sgn, and a value a0 is input to the phase amount a. The value a0 can be any value.

In step S104, the envelope of the preprocessing signal S(t) is acquired via the absolute value calculator 577 and the third low-pass filter 578. In step S104, a maximum value and a minimum value of the envelope are acquired, and a difference dS0 between the maximum value and the minimum value is stored in the memory. The difference dS0 corresponds to an amplitude of the preprocessing signal S(t).

In step S106, the phase amount setting unit 579 updates the phase amount a according to an expression "a+sgn*Δa→a", and sets the updated phase amount a as an output value. This expression refers to that a minute amount Δa is added to or subtracted from a current value of the phase amount a based on two values that the sign function sgn can take, that is, 1 or −1, to obtain a new phase amount a. The minute amount Δa is not particularly limited as long as the minute amount Δa is smaller than the phase amount a. The updated phase amount a is output to the adder 580. Then, the orthogonal signal generation unit 57 changes the phase of the reference signal Ss based on the new phase amount a set by the phase amount setting unit 579, and generates the cosine wave signal $\cos(\theta_m(t))$ and the sine wave signal $\sin(\theta_m(t))$ based on the updated reference signal Ss. Then, the preprocessing unit 53 generates a new preprocessing signal S(t) based on the cosine wave signal $\cos(\theta_m(t))$.

In step S108, the difference between the maximum value and the minimum value of the envelope is acquired for the new preprocessing signal S(t) in the same manner as in step S104, and is stored in the memory. In step S108, this difference is defined as dS1.

In step S110, it is determined whether the difference dS1 is equal to or less than a predetermined value. The predetermined value is, for example, the difference between the maximum value and the minimum value of the envelope when the preprocessing signal S(t) can be regarded as a signal subject to frequency modulation only. Therefore, when the difference dS1 is equal to or smaller than the predetermined value, it can be determined that the current phase amount a is optimal. Therefore, this flow ends. On the other hand, when the difference dS1 is greater than the predetermined value, it can be determined that the current phase amount a is not optimal, and thus the processing proceeds to step S112.

In step S112, the number of times the determination in step S110 has been performed is acquired. Then, it is determined whether the acquired number of times is equal to or greater than a predetermined number of times. The predetermined number of times is, for example, an actual value of the number of repetitions when the optimum phase amount a can be obtained in a case where an amplitude of the preprocessing signal S(t) is repeatedly evaluated while gradually changing the value of the phase amount a as described above. In particular, a maximum value of the actual value can be adopted as the predetermined number of times. A specific example of the number of repetitions includes the number of times the phase amount a is updated.

When the acquired number of times is equal to or greater than the predetermined number of times, it can be determined that it is difficult to obtain the optimum phase amount a, and thus the processing proceeds to step S114. In step S114, the phase amount setting unit 579 issues an error. In this case, a message indicating that an error has occurred may be displayed on the display unit described above, and a user may be prompted to cope with the error by, for example, changing the standard sample. After the error is issued, the flow ends. On the other hand, when the acquired number of times is less than the predetermined number of times, the processing proceeds to step S116.

In step S116, it is determined whether the difference dS1<the difference dS0. When the difference dS1<the difference dS0, it can be determined that the influence of the amplitude modulation on the new preprocessing signal S(t) is reduced. In addition, it can be determined that a value of the sign function sgn at the time of initialization in step S102 is appropriate. In this case, the processing proceeds to step S118. In step S118, a current value of the difference dS1 is input to the difference dS0. Then, the processing returns to step S106. In step S106 performed for the second time, the phase amount a is updated again according to the expression "a+sgn*Δa→a". Since it is determined that the sign function sgn in the expression is appropriate, the sign function sgn is not changed. Then, the preprocessing unit 53 generates a new preprocessing signal S(t) in which the updated phase amount a is reflected.

In step S108 performed for the second time, the difference between the maximum value and the minimum value of the envelope is acquired for the new preprocessing signal S(t), and is stored in the memory. The difference dS1 acquired in step S108 performed for the second time is smaller than the difference dS1 acquired in step S108 performed for the first time. Therefore, the influence of the amplitude modulation on the new preprocessing signal S(t) is further reduced, and the preprocessing signal S(t) is close to a signal subject to frequency modulation only.

On the other hand, when the difference dS1<the difference dS0 is not satisfied in step S116, that is, when the difference dS1 the difference dS0, it can be determined that the influence of amplitude modulation on the new preprocessing signal S(t) is not reduced. In addition, it can be determined that the value of the sign function sgn at the time of initialization in step S102 is not appropriate. In this case, the processing proceeds to step S120.

In step S120, the sign function sgn is reversed from the current value. That is, a value obtained by multiplying the current value by −1 is input to the new sign function sgn. Thereafter, the processing proceeds to step S118.

According to the flow as described above, unless an error is issued, the update of the phase amount a, the update of the preprocessing signal S(t), and the update of the difference dS0 are repeated until the difference dS1 is equal to or less than the predetermined value. As a result, the phase amount a is adjusted in the phase amount setting unit 579 until the preprocessing signal S(t) can be regarded as a signal subject to frequency modulation only, and the cosine wave signal $\cos(\theta_m(t))$ and the sine wave signal $\sin(\theta_m(t))$ that are orthogonal signals are generated based on the reference signal Ss whose phase has been adjusted.

By inputting the cosine wave signal $\cos(\theta_m(t))$ generated in this manner to the preprocessing unit 53, the preprocessing signal S(t) can be brought close to the original phase. As a result, the laser interferometer 1 can be calibrated. Then, after the calibration, the object 14 may be measured using the obtained optimum phase amount a. Accordingly, accuracy of demodulating the sample signal from the light detection signal can be increased, and the object 14 can be measured with high accuracy. The calibration of the laser interferometer 1 as described above may be performed at any timing and frequency.

Although the orthogonal signal generation unit 57 and the phase amount setting method have been described above, the orthogonal signal generation unit 57 may be omitted when the phases of the preprocessing signals S(t) are originally aligned and a calibration is unnecessary. In this case, the reference signal Ss and the signal obtained by shifting the phase of the reference signal Ss by π/2 may be used as the orthogonal signals.

1.2.6. Configuration of Demodulation Processing Unit

The demodulation processing unit 55 performs demodulation processing of demodulating a sample signal derived from the object 14 from the preprocessing signal S(t). The demodulation processing is not particularly limited, and a known orthogonal detection method may be used. The orthogonal detection method is a method for performing the demodulation processing by performing an operation of mixing external signals orthogonal to each other with an input signal.

The demodulation processing unit 55 shown in FIG. 10 is a digital circuit including a multiplier 551, a multiplier 552, an inverting amplifier 553, a first low-pass filter 555, a second low-pass filter 556, a divider 557, and an arctangent calculator 558.

The multipliers 551 and 552 are circuits that generate an output signal that is proportional to a product of two input signals. The inverting amplifier 553 is a circuit that generates an output signal by inverting a phase of an input signal without changing an amplitude of the input signal. The output signal has a gain of −1 time. Each of the first low-pass filter 555 and the second low-pass filter 556 is a filter that cuts off a signal in a high frequency band.

The divider 557 is a circuit that generates an output signal that is proportional to a quotient of two input signals. The arctangent calculator 558 is a circuit that outputs an arctangent of an input signal. An output signal from the arctangent calculator 558 is input to the signal output unit 559.

The signal output unit 559 calculates a phase $\varphi_d$ as information derived from the object 14, based on a phase φ acquired by the arctangent calculator 558. By phase unwrapping processing, the signal output unit 559 performs phase coupling when there is a phase jump of 2π between two adjacent points. Then, the displacement of the object 14 is calculated based on the obtained phase information. Accordingly, the function of serving as a displacement meter is implemented. In addition, the velocity of the object 14 can be obtained based on the displacement. Accordingly, the function of serving as a velocimeter is implemented.

The demodulation processing unit 55 is not limited to a digital circuit, and may be an analog circuit. The analog circuit may include an F/V converter circuit or a ΔΣ counter circuit.

The signal output unit 559 described above may calculate frequency information derived from the object 14. The velocity of the object 14 can be calculated based on the frequency information.

1.2.7. Demodulation Processing

In the demodulation processing, first, the preprocessing signal S(t) is split into two signals at a branch portion jp2. In the multiplier 551, one of the signals after splitting is multiplied by the sine wave signal $\sin(\theta_m(t))$ output from the sine generator 582 after passing through the inverting amplifier 553. That is, the multiplier 551 mixes a signal $-\sin(\theta_m(t))$ obtained by inverting a phase of the sine wave signal $\sin(\theta_m(t))$ with the preprocessing signal S(t). In the multiplier 552, the other one of the signals after splitting is multiplied by the cosine wave signal $\cos(\theta_m(t))$ output from the cosine generator 581. That is, the multiplier 552 mixes the cosine wave signal $\cos(\theta_m(t))$ with the preprocessing signal S(t).

The signal after passing through the multiplier 551 passes through the first low-pass filter 555, and is then input to the divider 557 as a signal y. The signal after passing through the multiplier 552 passes through the second low-pass filter 556, and is then input to the divider 557 as a signal x. In the present specification, the signals x and y are collectively referred to as a "mixed signal". The divider 557 divides the signal y by the signal x, and an output y/x passes through the arctangent calculator 558 to obtain a calculation result a tan(y/x). Accordingly, the phase information of the sample signal is obtained.

Thereafter, the calculation result a tan(y/x) is input to the signal output unit 559 to output the displacement and the velocity of the object 14.

Figure 12:
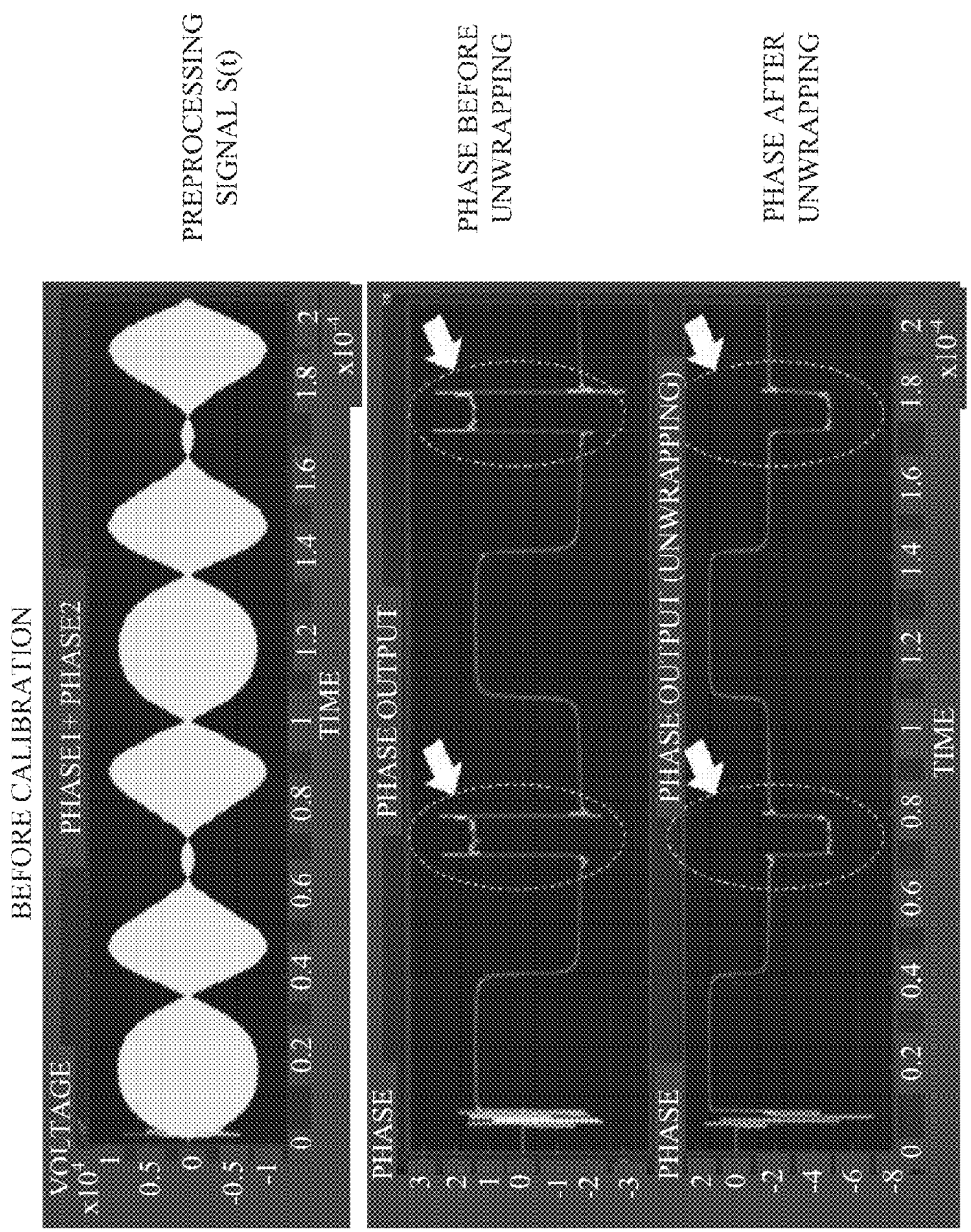
FIG. 12 shows an example of waveforms indicating a preprocessing signal S(t) before a calibration of the laser interferometer is performed based on a flow shown in FIG. 11, phase information demodulated by a demodulation processing unit (phase information before unwrapping), and phase information subjected to phase unwrapping processing by a signal output unit (phase information after unwrapping).

FIG. 12 is an example of waveforms indicating the preprocessing signal S(t) before a calibration of the laser interferometer 1 is performed based on the flow shown in FIG. 11, phase information demodulated by the demodulation processing unit 55 (phase information before unwrapping), and phase information subjected to the phase unwrapping processing by the signal output unit 559 (phase information after unwrapping).

As shown in FIG. 12, the waveform of the preprocessing signal S(t) before the calibration has a large change in amplitude, and the preprocessing signal S(t) is a signal in which frequency modulation and amplitude modulation are superimposed. Therefore, the amplitude of the envelope of the preprocessing signal S(t) also increases. Therefore, in the phase information before unwrapping shown in FIG. 12, irregular waveforms are generated at positions indicated by arrows, and the waveform of the phase information after unwrapping is a discontinuous waveform. In this case, it is difficult to accurately obtain the displacement of the object 14 based on the phase information after unwrapping.

Figure 13:
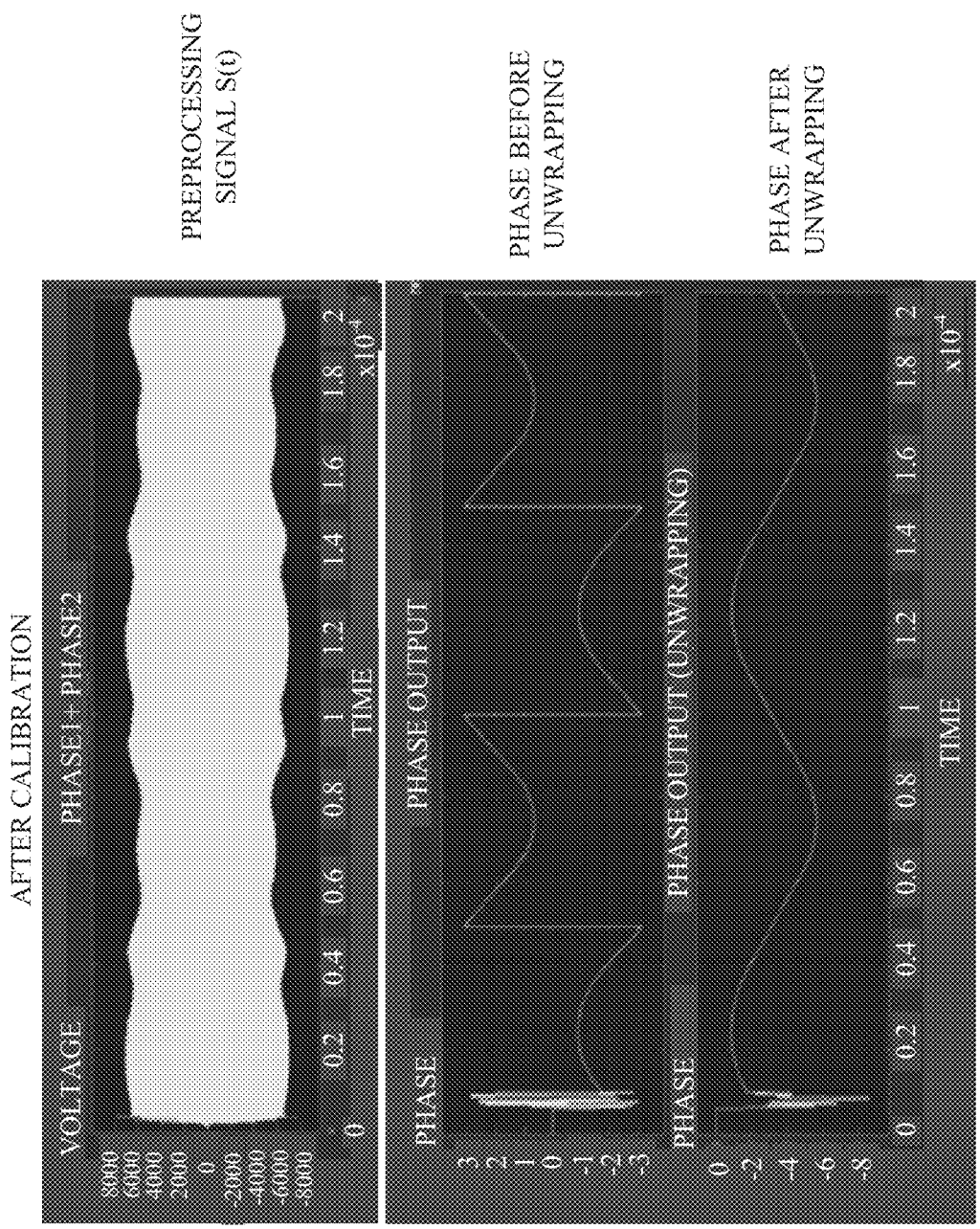
FIG. 13 shows an example of waveforms indicating a preprocessing signal S(t) after the calibration of the laser interferometer is performed based on the flow shown in FIG. 11, phase information demodulated by the demodulation processing unit (phase information before unwrapping), and phase information subjected to the phase unwrapping processing by the signal output unit (phase information after unwrapping).

FIG. 13 is an example of waveforms indicating the preprocessing signal S(t) after the calibration of the laser interferometer 1 is performed based on the flow shown in FIG. 11, phase information demodulated by the demodulation processing unit 55 (phase information before unwrapping), and phase information subjected to the phase unwrapping processing by the signal output unit 559 (phase information after unwrapping).

As shown in FIG. 13, the waveform of the preprocessing signal S(t) after the calibration has a small change in amplitude, and the preprocessing signal S(t) is substantially a signal subject to frequency modulation only. Therefore, the amplitude of the envelope of the preprocessing signal S(t) also decreases. Therefore, no irregular waveform is generated in the phase information before unwrapping shown in FIG. 13. In addition, the waveform of the phase information after unwrapping shown in FIG. 13 is a continuous waveform. In this case, the displacement of the object 14 can be accurately obtained based on the phase information after unwrapping.

1.2.8. Correction Processing Unit

As shown in FIG. 1, the reference signal Ss output from the signal generation unit 61 and an output signal Sm output in response to the driving of the optical modulator 12 are input to the correction processing unit 62. The correction processing unit 62 outputs a frequency control signal Sf1 (correction signal) to the voltage controlled oscillator 612. Further, the correction processing unit 62 outputs an amplification factor control signal Sam (correction signal) to the amplifier 614.

The correction processing unit 62 is mounted in, for example, an FPGA, and is preferably provided in the sensor head unit 51. Accordingly, a physical distance between the correction processing unit 62 and the optical modulator 12 can be shortened, and for example, a decrease in S/N ratio of the output signal Sm due to the influence of electromagnetic noise can be prevented.

Figure 14:
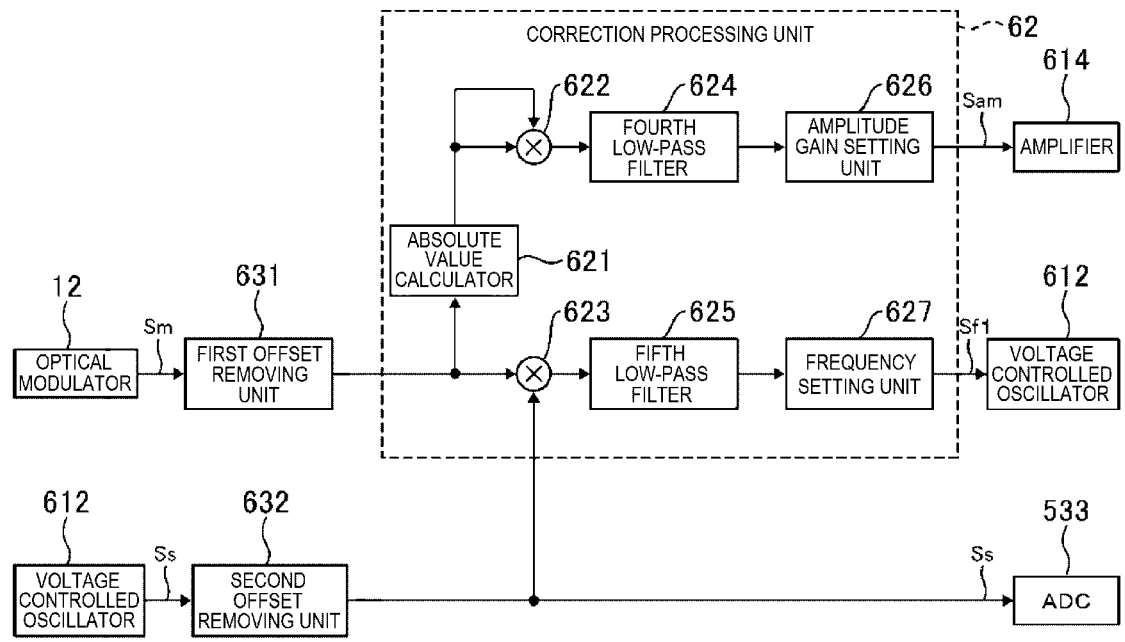
FIG. 14 is a diagram showing details of a correction processing unit in the functional block diagram shown in FIG. 1.

FIG. 14 is a diagram showing details of the correction processing unit 62 in the functional block diagram shown in FIG. 1.

The output signal Sm from the optical modulator 12 is input to a first offset removing unit 631 shown in FIG. 14. The first offset removing unit 631 has a function of removing a direct current (DC) component and extracting an alternating current (AC) component. The output signal Sm after passing through the first offset removing unit 631 is input to the correction processing unit 62.

The reference signal Ss from the voltage controlled oscillator 612 is input to a second offset removing unit 632 shown in FIG. 14. The second offset removing unit 632 has a function of removing a direct current (DC) component and extracting an alternating current (AC) component. The reference signal Ss after passing through the second offset removing unit 632 is input to the correction processing unit 62 and the ADC 533.

The correction processing unit 62 shown in FIG. 14 includes an absolute value calculator 621, a multiplier 622, a multiplier 623, a fourth low-pass filter 624, a fifth low-pass filter 625, an amplitude gain setting unit 626, and a frequency setting unit 627.

The absolute value calculator 621 calculates an absolute value of the output signal Sm after passing through the first offset removing unit 631.

The multipliers 622 and 623 are circuits that output a signal that is proportional to a product of two input signals. Among them, in the multiplier 622, both of the two input signals are the output signal Sm. Therefore, the multiplier 622 outputs a signal that is proportional to a square of the output signal Sm. On the other hand, in the multiplier 623, the two input signals are the output signal Sm and the reference signal Ss. Therefore, the multiplier 623 outputs a signal that is proportional to a product of the output signal Sm and the reference signal Ss.

The multipliers 622 and 623 may be, for example, a Gilbert cell device, or may be a circuit that performs addition and subtraction after logarithmically conversing two input signals with an operational amplifier or the like, and thereafter performs inverse logarithmic conversion.

The fourth low-pass filter 624 and the fifth low-pass filter 625 are filters that cut off a signal in a high frequency band for the input signal. A transmission frequency band of the fourth low-pass filter 624 and the fifth low-pass filter 625 may be any band as long as it is a band in which a frequency equal to or higher than twice the frequency of the drive signal Sd can be removed, and is preferably a band in which a frequency equal to or higher than the frequency of the drive signal Sd can be removed.

The signal output from the multiplier 622 and after passing through the fourth low-pass filter 624 becomes a signal having a value corresponding to an amplitude of the output signal Sm, as will be described later. The amplitude gain setting unit 626 has a function of obtaining, based on the signal, an amplitude (target amplitude) to be set to the drive signal Sd. The amplitude gain setting unit 626 controls a gain (amplification factor) to be set in the amplifier 614 of the signal generation unit 61 such that the amplitude of the drive signal Sd is the target amplitude. Examples of a control logic include feedback control such as PI control and PID control. The amplitude gain setting unit 626 outputs, to the amplifier 614, the amplification factor control signal Sam corresponding to the gain to be set.

The amplifier 614 amplifies the amplitude of the drive signal Sd based on the amplification factor control signal Sam. Accordingly, the amplitude of the drive signal Sd is corrected.

The signal output from the multiplier 623 and input through the fifth low-pass filter 625 becomes a signal having a value corresponding to a phase difference between the output signal Sm and the reference signal Ss, as will be described later. Here, a phase of the output signal Sm corresponds to a phase of the drive signal Sd. The phase of the drive signal Sd corresponds to the phase of the reference signal Ss. Therefore, the frequency setting unit 627 has a function of obtaining a frequency (target frequency) to be set to the reference signal Ss. Then, the frequency setting unit 627 controls a voltage to be set in the voltage controlled oscillator 612 of the signal generation unit 61 such that the frequency of the reference signal Ss is the target frequency. Examples of a control logic include feedback control such as PI control and PID control. The frequency setting unit 627 outputs, to the voltage controlled oscillator 612, the frequency control signal Sf1 corresponding to the frequency to be set.

The voltage controlled oscillator 612 generates a reference signal Ss having a frequency corresponding to the frequency control signal Sf1. Accordingly, the frequency of the reference signal Ss is corrected. Accordingly, the frequency of the drive signal Sd is also corrected.

1.2.9. Acquisition of Output Signal from Optical Modulator

Figure 15:
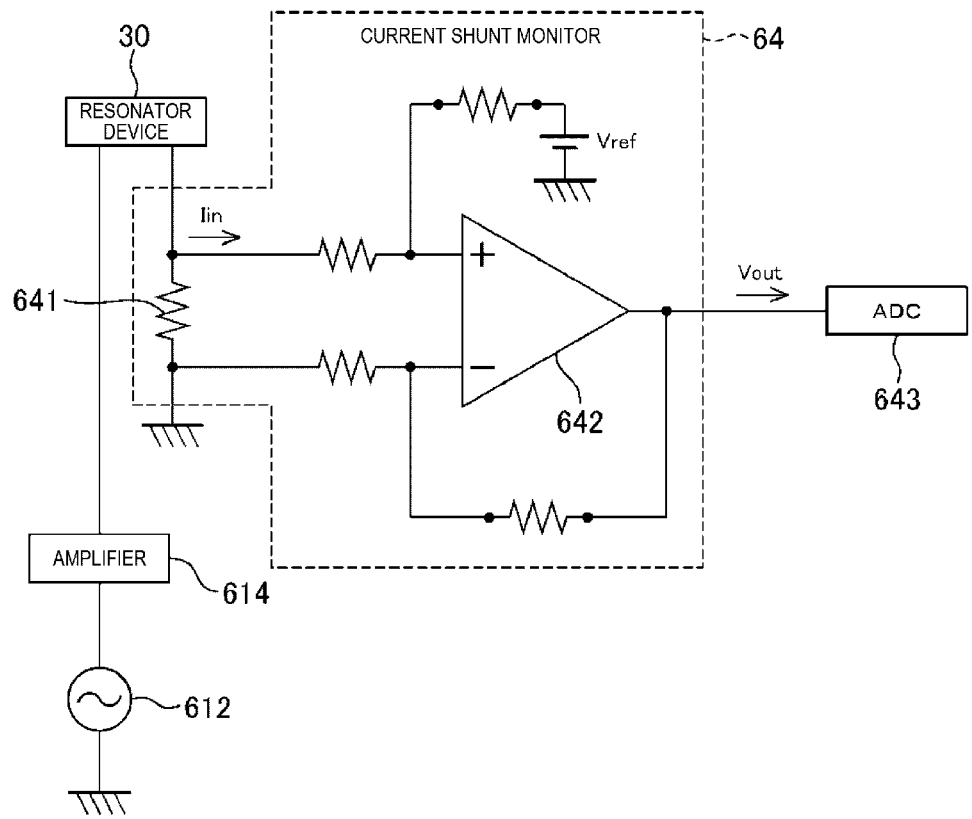
FIG. 15 is a diagram showing an example of a circuit for acquiring an output signal Sm from the optical modulator.

FIG. 15 is a diagram showing an example of a circuit for acquiring the output signal Sm from the optical modulator 12.

The output signal Sm may be a signal obtained by detecting a current flowing through the vibrator 30 provided in the optical modulator 12, or may be a signal obtained by detecting a voltage applied to the vibrator 30. For example, when the signal obtained by detecting a current flowing through the vibrator 30 is set as the output signal Sm, as shown in FIG. 15, a value of the current flowing through the vibrator 30 is detected using a current shunt monitor 64. The current shunt monitor 64 shown in FIG. 15 includes a shunt resistor 641 and an operational amplifier 642, and converts the value of the current flowing through the vibrator 30 into a voltage value for detection. Accordingly, the output signal Sm, which is a voltage signal, is obtained. The obtained output signal Sm is converted into a digital signal by the ADC 643, and the digital signal is output to the first offset removing unit 631.

Examples of a method for detecting the current flowing through the vibrator 30 include a method using a Hall device and a method of detecting an electromotive force by winding a coil around a current path, in addition to the above-described method.

1.2.9. Correction Processing

Next, correction processing in the correction processing unit 62 will be described. The correction processing refers to changing set values of the voltage controlled oscillator 612 and the amplifier 614 based on the correction signal output from the correction processing unit 62 to correct the drive signal Sd and the reference signal Ss.

When the output signal Sm from the optical modulator 12 is, for example, a voltage signal, the output signal Sm before passing through the first offset removing unit 631 is expressed by the following formula (16).

$$V_{QOM}=A_m \sin(\omega_m t+\alpha_{m1})+O_{QOM} \tag{16}$$

In the above formula (16), $V_{QOM}$ is a voltage value of the output signal Sm. $A_m$ is a coefficient corresponding to the amplitude of the output signal Sm, $\alpha_{m1}$ is a phase difference of the output signal Sm with respect to the reference signal Ss, and $-\pi/2<\alpha_{m1}<\pi/2$ is satisfied. Further, $O_{QOM}$ is a DC component of the output signal Sm.

Then, the output signal Sm after passing through the first offset removing unit 631 is expressed by the following formula (16-1).

$$V_{QOM}=A_m \sin(\omega_m t+\alpha_{m1}) \tag{16-1}$$

On the other hand, the reference signal Ss before passing through the second offset removing unit 632 is expressed by the following formula (18).

$$V_{OSC}=v_{OSC} \cos(\omega_m t)+O_{OSC} \tag{18}$$

In the above formula (18), $V_{OSC}$ is a voltage value of the reference signal Ss. In addition, $v_{OSC}$ is a coefficient corresponding to an amplitude of the reference signal Ss, and $O_{OSC}$ is a DC component of the reference signal Ss.

Then, the reference signal Ss after passing through the second offset removing unit 632 is expressed by the following formula (18-1).

$$V_{OSC}=v_{OSC} \cos(\omega_m t) \tag{18-1}$$

The output signal Sm after passing through the first offset removing unit 631 is split into two signals. One output signal Sm is squared by the multiplier 622 after passing through the absolute value calculator 621, and as a result is expressed by the following formula (16-2).

$$V_{QOM}^2 = \frac{A_m^2}{2}\{1-\cos(2\omega_m t + 2\alpha_{m1})\} \tag{16-2}$$

Thereafter, when the one output signal Sm passes through the fourth low-pass filter 624, only the first term of the above formula (16-2) on a right side is extracted. Accordingly, the output signal Sm after passing through the fourth low-pass filter 624 is expressed by the following formula (16-3).

$$V_{QOM}^2 = \frac{A_m^2}{2} \quad (16\text{-}3)$$

As expressed by the above formula (16-3), an input signal $V_{QOM}^2$ input to the amplitude gain setting unit 626 is a signal that does not change with time. Therefore, the amplitude gain setting unit 626 performs feedback control for the output signal Sm expressed by the above formula (16-3) using a value obtained by substituting the target coefficient $A_m$ into the above formula (16-3) as a control target value. Then, the amplification factor control signal Sam corresponding to the control target value is output to the amplifier 614 of the signal generation unit 61. Accordingly, a gain of the amplitude in the amplifier 614 can be changed to correct the amplitude of the drive signal Sd to the target amplitude.

The other one output signal Sm of the two signals after splitting is multiplied by the reference signal Ss by the multiplier 623. Accordingly, the signal output from the multiplier 623 is expressed by the following formula (17-2).

$$V_{QOM} \cdot V_{OSC} = \frac{A_m v_{OSC}}{2} \{\sin(\alpha_{m1}) + \sin(2\omega_m t + \alpha_{m1})\} \quad (17\text{-}2)$$

Thereafter, when the other one output signal Sm passes through the fifth low-pass filter 625, only the first term of the above formula (17-2) on a right side is extracted. Accordingly, the output signal Sm after passing through the fifth low-pass filter 625 is expressed by the following formula (17-3).

$$V_{QOM} \cdot V_{OSC} = \frac{A_m v_{OSC}}{2} \sin(\alpha_{m1}) \quad (17\text{-}3)$$

As expressed by the above formula (17-3), the input signal $V_{QOM} \cdot V_{OSC}$ input to the frequency setting unit 627 is a signal including the coefficient $A_m$, the coefficient $v_{OSC}$, and a phase difference $\alpha_{m1}$ on the right side. Among them, the coefficient $v_{OSC}$ is known. On the other hand, the coefficient $A_m$ is controlled so as to satisfy $0<A_m$ and converge to the target coefficient $A_m$ as described above. Therefore, the input signal $V_{QOM} \cdot V_{OSC}$ is also a signal that does not change with time. Therefore, the frequency setting unit 627 performs feedback control using, for example, a value obtained by substituting the target phase difference $\alpha_{m1}$ into the above formula (17-3) as a control target value. Then, the frequency control signal Sf1 corresponding to the control target value is output to the voltage controlled oscillator 612 of the signal generation unit 61. Accordingly, the frequency of the reference signal Ss output from the voltage controlled oscillator 612 can be changed to correct the frequency of the reference signal Ss to a target frequency. The frequency of the drive signal Sd can also be corrected to a target frequency.

The target phase difference $\alpha_{m1}$ can be determined based on, for example, a relationship between the phase difference of the drive signal Sd and the phase difference of the output signal Sm in the vibrator 30 that vibrates at a mechanical resonance frequency. Specifically, it is known that in such a vibrator 30, the phase of the output signal Sm is delayed by about 90 [deg] with respect to the input drive signal Sd. In addition, in a process until the output signal Sm is input to the correction processing unit 62, a phase delay δ [deg] may occur. In consideration of these, the target phase difference $\alpha_{m1}$ can be, for example, 90+δ [deg]. The phase delay δ can be obtained by experiments or simulations.

When a temperature change or the like occurs, the mechanical resonance frequency may change, and the efficiency of converting the input power of the vibrator 30 into vibration may change. When the conversion efficiency changes, the amplitude of the vibration of the vibrator 30 changes. Therefore, in the correction processing, first, the correction of the frequency of the reference signal Ss and the frequency of the drive signal Sd is preferentially performed. Thereafter, the amplitude of the drive signal Sd is corrected as necessary. By executing the correction processing in such an order, it is possible to efficiently control the frequency and the amplitude to target values.

In view of the control by the frequency setting unit 627 described above, it is desirable to converge the control of the signal input to the amplitude gain setting unit 626 earlier than the control of the signal input to the frequency setting unit 627. Accordingly, instability of the target control value in the frequency setting unit 627 is prevented, and thus instability of the correction processing can be prevented.

The amplitude gain setting unit 626 and the frequency setting unit 627 are configured by combining operational amplifiers or the like so as to perform, for example, a feedback control operation such as PID control. In this case, in order to converge the control of the signal input to the amplitude gain setting unit 626 earlier than the control of the signal input to the frequency setting unit 627, a crossing frequency of an open-loop transfer function of a control loop in the operation of the amplitude gain setting unit 626 may be set higher than a crossing frequency of an open-loop transfer function of a control loop in the operation of the frequency setting unit 627.

By performing the correction processing as described above, the following effects can be obtained.

When the mechanical resonance frequency of the vibrator 30 changes under the influence of disturbance such as an ambient temperature change, gravity change, vibration, or noise, the frequency and the amplitude of the vibration of the vibrator 30 changes, and the S/N ratio of the modulation signal decreases. Accordingly, the demodulation accuracy of the sample signal decreases.

On the other hand, by performing the correction processing as described above, it is possible to maintain the frequency and the amplitude of the vibration of the vibrator 30 to be constant even when disturbance such as a temperature change is applied. That is, even when disturbance such as a temperature change is applied, the frequency and the amplitude of the vibration of the vibrator 30 can be corrected so as not to change. Accordingly, it is possible to prevent a decrease in S/N ratio of the modulation signal. As a result, even when disturbance such as a temperature change is applied, it is possible to improve the accuracy of the preprocessing and the demodulation processing in the calculation unit 52, and it is possible to prevent a decrease in demodulation accuracy of the sample signal.

Even when the mechanical resonance frequency changes due to disturbance such as a temperature change, the frequency of the drive signal Sd can be made to follow the change, and thus the vibrator 30 can be continuously driven near the mechanical resonance frequency of the vibrator 30. Accordingly, the driving efficiency of the vibrator 30 increases, so that the power consumption of the laser interferometer 1 can be reduced. When the vibrator 30 is driven by, for example, an oscillation circuit, it is difficult to drive the vibrator 30 near the mechanical resonance frequency of the vibrator 30. The reason for this is that the circuit configuration of the oscillation circuit is impractical due to various restrictions.

1.2.10. Effects of First Embodiment

As described above, the laser interferometer 1 according to the embodiment includes the laser light source 2, the optical modulator 12, the photodetector 10, the calculation unit 52, and the signal generation unit 61. The laser light source 2 emits the emission light L1 (laser light). The optical modulator 12 includes the vibrator 30 driven by the drive signal Sd, and superimposes the modulation signal on the emission light L1 using the vibrator 30. The photodetector 10 receives the object light L3 including the sample signal superimposed thereon due to reflection from the object 14 (laser light including a sample signal) and the reference light L2 including the modulation signal (laser light including a modulation signal), and outputs the light receiving signal. The calculation unit 52 performs a calculation on the light receiving signal based on the reference signal Ss. The signal generation unit 61 outputs the drive signal Sd and the reference signal Ss.

The calculation unit 52 includes the preprocessing unit 53, the demodulation processing unit 55, and the correction processing unit 62. The preprocessing unit 53 performs the preprocessing for extracting the frequency modulation component from the light receiving signal, and outputs the preprocessing signal S(t) including the frequency modulation component. The demodulation processing unit 55 mixes the preprocessing signal S(t) with the orthogonal signals to obtain the signals x and y (mixed signal), and then demodulates the sample signal from the signals x and y. The correction processing unit 62 outputs the amplification factor control signal Sam and the frequency control signal Sf1, which are correction signals, based on the output signal Sm output in response to the driving of the vibrator 30. The signal generation unit 61 corrects the drive signal Sd and the reference signal Ss based on the amplification factor control signal Sam and the frequency control signal Sf1.

With such a configuration, even when disturbance such as a temperature change is applied, the frequency and the amplitude of the drive signal Sd can be made to follow the change in the mechanical resonance frequency and the vibration amplitude of the vibrator 30. Accordingly, the frequency and the amplitude of the vibration of the vibrator 30 can be maintained constant. As a result, a decrease in S/N ratio of the modulation signal can be prevented, and a decrease in demodulation accuracy of the sample signal can be prevented. Accordingly, it is possible to implement the laser interferometer 1 capable of measuring the displacement and the velocity of the object 14 with high accuracy even when disturbance is applied. In addition, since the vibrator 30 can be driven near the mechanical resonance frequency of the vibrator 30 by using the signal generation unit 61 and the correction processing unit 62, the power consumption of the laser interferometer 1 can be reduced.

The correction processing unit 62 is preferably configured to correct the frequency of the reference signal Ss and the frequency of the drive signal Sd based on the phase difference between the output signal Sm and the reference signal Ss.

According to such a configuration, the phase difference between the output signal Sm output in response to the driving of the optical modulator 12 and the reference signal Ss can be fed back to the frequency. The phase difference between the output signal Sm and the reference signal Ss directly reflects the influence of the disturbance on the modulation signal, and is therefore suitable for the input signal used for the feedback control. Therefore, according to the above configuration, the influence of the disturbance can be corrected in real time, and the laser interferometer 1 having particularly high resistance to the disturbance can be implemented.

The correction processing unit 62 is preferably configured to correct the amplitude of the drive signal Sd based on the amplitude of the output signal Sm.

According to such a configuration, the amplitude of the output signal Sm output in response to the driving of the optical modulator 12 can be fed back to the amplitude of the drive signal Sd. The amplitude of the output signal Sm directly reflects the influence of the disturbance on the modulation signal, and is therefore suitable for the input signal used for the feedback control. Therefore, according to the above configuration, the influence of the disturbance can be corrected in real time, and the laser interferometer 1 having particularly high resistance to the disturbance can be implemented.

The signal generation unit 61 includes the voltage controlled oscillator 612 that is an oscillator, and the amplifier 614. The voltage controlled oscillator 612 generates the reference signal Ss. The amplifier 614 adjusts the amplitude of the reference signal Ss and outputs the adjusted reference signal Ss as the drive signal Sd.

According to such a configuration, the amplifier 614 generates the drive signal Sd based on the reference signal Ss generated by the voltage controlled oscillator 612. Accordingly, the signal generation unit 61 can correct the frequency of the reference signal Ss and the frequency of the drive signal Sd based on the frequency control signal Sf1. Further, the amplitude of the drive signal Sd can be individually corrected based on the amplification factor control signal Sam.

In the embodiment, the voltage controlled oscillator 612 is used as the oscillator of the signal generation unit 61. Accordingly, a general-purpose voltage controlled oscillator 612 can be used, and thus the cost of the signal generation unit 61 can be easily reduced.

As described above, the vibrator 30 is preferably a quartz crystal resonator. Accordingly, a highly accurate modulation signal can be generated using an extremely high Q value of a quartz crystal. As a result, the sample signal derived from the object 14 can be demodulated with higher accuracy. Examples of the quartz crystal resonator include a quartz crystal AT resonator, an SC cut quartz crystal resonator, and a tuning-fork type quartz crystal resonator.

In the embodiment, the orthogonal signal generation unit 57 generates the orthogonal signals described above based on the phase of the reference signal Ss and the amplitude of the preprocessing signal S(t). Further, the orthogonal signal generation unit 57 adjusts the phase of the reference signal Ss based on the amplitude of the preprocessing signal S(t). Then, by inputting the cosine wave signal $\cos(\theta_m(t))$, which is the adjusted signal, to the preprocessing unit 53, the preprocessing signal S(t) can be brought close to a signal subject to frequency modulation only, and the accuracy of demodulating the sample signal derived from the object 14 from the light receiving signal can be increased.

According to such a configuration, even when the phase of the reference signal Ss is shifted from the original phase, it is possible to calibrate the phase of the reference signal Ss. Accordingly, the laser interferometer 1 capable of measuring the displacement and the velocity of the object 14 with high accuracy can be implemented.

In the embodiment, the orthogonal signal generation unit 57 includes the phase amount setting unit 579 that sets the phases of the orthogonal signals based on the amplitude of the preprocessing signal S(t). As described above, the phase amount setting unit 579 has a function of setting the phase amount a to be added by the adder 580. The orthogonal signal generation unit 57 adjusts the phase of the reference signal Ss based on the phase amount a, and generates the orthogonal signals, that is, the cosine wave signal $\cos(\theta_m(t))$ and the sine wave signal $\sin(\theta_m(t))$. The demodulation processing unit 55 mixes the orthogonal signals with the preprocessing signal S(t). It is possible to align the phases of the preprocessing signal S(t) and the orthogonal signals by appropriately setting the phase amount a. As a result, the demodulation processing unit 55 can perform the demodulation processing from the preprocessing signal S(t) with high accuracy.

In the embodiment, the phase amount setting unit 579 sets the phases of the orthogonal signals such that the difference between the maximum value of the amplitude of the preprocessing signal S(t) and the minimum value of the amplitude of the preprocessing signal S(t) is equal to or less than a predetermined value.

Accordingly, the optimum phase amount a can be efficiently set in the phase amount setting unit 579 such that the preprocessing signal S(t) becomes a signal subject to frequency modulation only or a signal equivalent to such a signal.

In the embodiment, the orthogonal signal generation unit 57 includes the Hilbert transform filter 572, the second delay adjuster 573 (reference signal delay device), and the reference signal phase calculator 574. The Hilbert transform filter 572 performs Hilbert transform processing on the reference signal Ss to obtain the signal i. The second delay adjuster 573 delays the reference signal Ss to obtain the signal r. The reference signal phase calculator 574 performs the arctangent calculation on the ratio of the signal i to the signal r to obtain the phase of the reference signal Ss.

According to such a configuration, the phase of the reference signal Ss can be instantaneously obtained without sampling the reference signal Ss. Therefore, in the orthogonal signal generation unit 57 including such a phase amount setting unit 579, the phase of the reference signal Ss can be reflected on the orthogonal signals in real time.

2. Second Embodiment

Next, a laser interferometer according to a second embodiment will be described.

Figure 16:
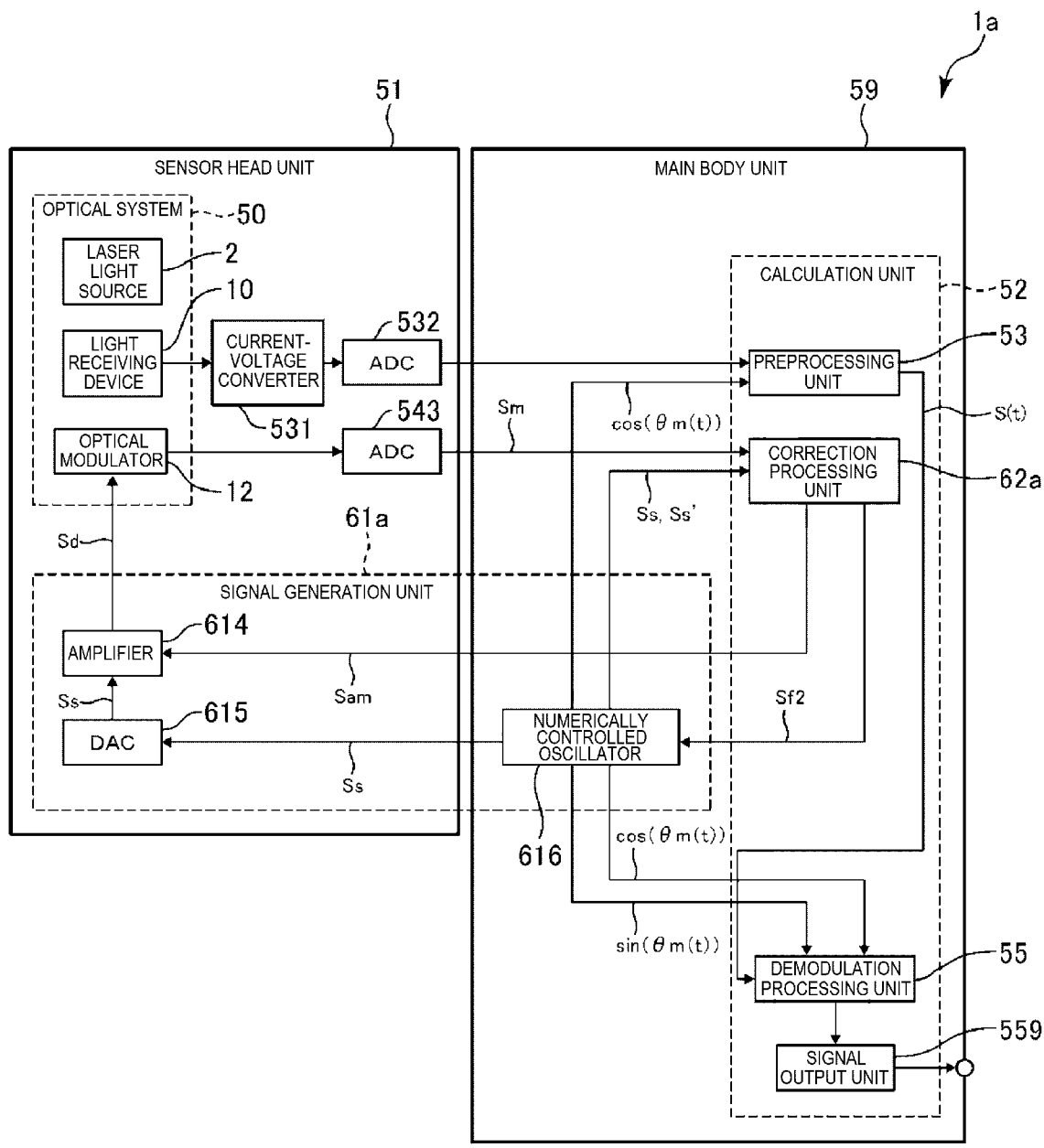
FIG. 16 is a functional block diagram showing a laser interferometer according to a second embodiment.
Figure 17:
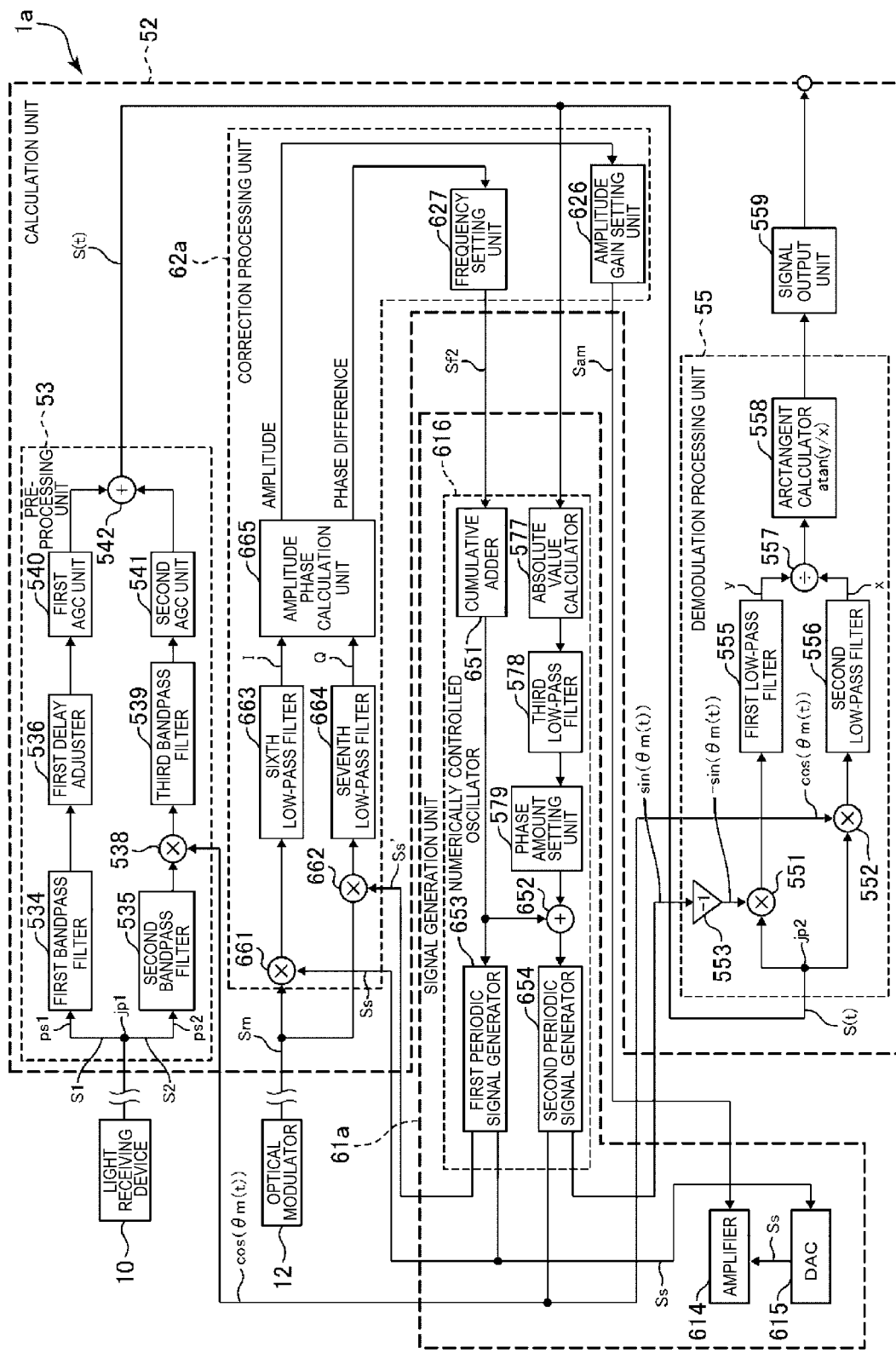
FIG. 17 is a diagram showing details of a calculation unit and a signal generation unit in the functional block diagram in FIG. 16.

FIG. 16 is a functional block diagram showing a laser interferometer 1a according to the second embodiment. FIG. 17 is a diagram showing details of the calculation unit 52 and a signal generation unit 61a in the functional block diagram in FIG. 16.

Hereinafter, the second embodiment will be described, and in the following description, differences from the first embodiment will be mainly described, and description of similar matters will be omitted. In FIGS. 16 and 17, the same components as those of the first embodiment are denoted by the same reference numerals.

The embodiment is the same as the first embodiment except that configurations of the signal generation unit 61a and a correction processing unit 62a are different.

As shown in FIG. 16, the signal generation unit 61a includes a numerically controlled oscillator 616, a DAC 615, and the amplifier 614.

As shown in FIG. 17, the correction processing unit 62a includes multipliers 661 and 662, a sixth low-pass filter 663, a seventh low-pass filter 664, an amplitude phase calculation unit 665, the frequency setting unit 627, and the amplitude gain setting unit 626.

2.1. Signal Generation Unit

As shown in FIG. 16, the signal generation unit 61a includes the numerically controlled oscillator 616, the DAC 615, and the amplifier 614.

The numerically controlled oscillator 616 generates a periodic signal such as a sine wave or a cosine wave by reading, from a ROM table storing numerical values of a sine wave and a cosine wave for one period, address data added at regular clock intervals. Accordingly, the numerically controlled oscillator 616 generates the reference signal Ss having a target frequency with high accuracy and outputs the reference signal Ss to the DAC 615. The DAC 615 is a digital-to-analog converter, and generates an analog reference signal Ss based on the input digital reference signal Ss.

The amplifier 614 amplifies the input reference signal Ss, generates the drive signal Sd having a target amplitude, and outputs the drive signal Sd to the optical modulator 12.

The numerically controlled oscillator 616 includes a cumulative adder 651, the absolute value calculator 577, the third low-pass filter 578, the phase amount setting unit 579, an adder 652, a first periodic signal generator 653, and a second periodic signal generator 654.

The cumulative adder 651 cumulatively adds a frequency control signal Sf2 output from the frequency setting unit 627 of the correction processing unit 62a. As will be described later, the frequency control signal Sf2 is a phase lead amount per unit time step, which corresponds to a frequency to be set in the reference signal Ss. The cumulative adder 651 cumulatively adds the phase lead amount to calculate a cumulative addition value. The obtained cumulative addition value is output to the first periodic signal generator 653.

The first periodic signal generator 653 includes a read only memory (ROM) that stores numerical values of a sine wave and a cosine wave for one period. In the first periodic signal generator 653, an address numerical value corresponding to the cumulative addition value is read. Accordingly, a sine wave signal and a cosine wave signal having a frequency corresponding to the frequency control signal Sf2 can be generated. The cosine wave signal is separately output as the reference signal Ss to the DAC 615 of the signal generation unit 61a and the multiplier 661 of the correction processing unit 62a. The sine wave signal is output as a reference signal Ss' to the multiplier 662 of the correction processing unit 62a.

As described above, the phase amount setting unit 579 sets the phase amount a to be added to the cumulative addition value by the adder 652. The adder 652 calculates a sum of the cumulative addition value and the phase amount a. The sum of the obtained cumulative addition value and the phase amount a is output to the second periodic signal generator 654.

The second periodic signal generator 654 includes a read only memory (ROM) that stores numerical values of a sine wave and a cosine wave for one period. In the second periodic signal generator 654, an address numerical value corresponding to the sum of the cumulative addition value and the phase amount a is read. Accordingly, a sine wave signal $\sin(\theta_m(t))$ and a cosine wave signal $\cos(\theta_m(t))$ to which a phase offset of the phase amount a is added can be generated at a frequency corresponding to the frequency control signal Sf2. The cosine wave signal $\cos(\theta_m(t))$ is output to the multiplier 538 and the demodulation processing unit 55 to be described later, and the sine wave signal $\sin(\theta_m(t))$ is output to the demodulation processing unit 55.

Although the configuration example of the numerically controlled oscillator 616 has been described above, the configuration of the numerically controlled oscillator 616 is not limited thereto.

2.2. Correction Processing Unit

As shown in FIG. 16, the output signal Sm output in response to the driving of the optical modulator 12 is input to the correction processing unit 62a. The correction processing unit 62a acquires, by orthogonal detection, a phase difference between the output signal Sm and the reference signal Ss and an amplitude of the output signal Sm.

The correction processing unit 62a has a function of outputting the frequency control signal Sf2 (correction signal) to the numerically controlled oscillator 616 and a function of outputting the amplification factor control signal Sam (correction signal) to the amplifier 614.

The output signal Sm from the optical modulator 12 is input to the correction processing unit 62a via the ADC 543 shown in FIG. 16. The ADC 543 is an analog-to-digital converter. The output signal Sm converted into a digital signal by the ADC 543 is split into two signals as shown in FIG. 17. One output signal Sm is multiplied by the reference signal Ss by the multiplier 661. The signal output from the multiplier 661 passes through the sixth low-pass filter 663, and is thus input as a signal I to the amplitude phase calculation unit 665. The other one output signal Sm is multiplied by the reference signal Ss' by the multiplier 662. The signal output from the multiplier 662 passes through the seventh low-pass filter 664, and is thus input as a signal Q to the amplitude phase calculation unit 665.

A transmission frequency band of the sixth low-pass filter 663 and the seventh low-pass filter 664 is preferably a band in which a frequency equal to or higher than the frequency of the drive signal Sd can be removed.

The amplitude phase calculation unit 665 performs an a tan(Q/I) calculation to calculate a phase of the output signal Sm. The amplitude phase calculation unit 665 outputs the phase difference between the output signal Sm and the reference signal Ss to the frequency setting unit 627. In addition, the amplitude phase calculation unit 665 performs a $(I^2+Q^2)^{1/2}$ calculation to calculate the amplitude of the output signal Sm. The amplitude phase calculation unit 665 outputs the calculated amplitude to the amplitude gain setting unit 626. For example, a coordinate rotation digital computer (CORDIC), which is a hardware demodulation circuit, is used as the amplitude phase calculation unit 665, but the amplitude phase calculation unit 665 is not limited thereto.

The frequency setting unit 627 has a function of obtaining a target frequency of the reference signal Ss. Then, the frequency setting unit 627 controls the frequency control signal Sf2 such that the frequency of the reference signal Ss is the target frequency, and outputs the frequency control signal Sf2 to the numerically controlled oscillator 616.

The numerically controlled oscillator 616 generates the reference signal Ss based on the frequency control signal Sf2. Accordingly, the frequency of the reference signal Ss is corrected.

The amplitude gain setting unit 626 has a function of obtaining a target amplitude of the drive signal Sd. Then, the amplitude gain setting unit 626 controls the amplification factor control signal Sam such that the amplitude of the drive signal Sd is the target amplitude, and outputs the amplification factor control signal Sam to the amplifier 614.

The amplifier 614 amplifies the amplitude of the drive signal Sd based on the amplification factor control signal Sam. Accordingly, the amplitude of the drive signal Sd is corrected.

2.3. Effects of Second Embodiment

As described above, the laser interferometer 1a according to the embodiment includes the laser light source 2, the optical modulator 12, the photodetector 10, the calculation unit 52, and the signal generation unit 61a. The laser light source 2 emits the emission light L1 (laser light). The optical modulator 12 includes the vibrator 30 driven by the drive signal Sd, and superimposes the modulation signal on the emission light L1 using the vibrator 30. The photodetector 10 receives the object light L3 including the sample signal superimposed thereon due to reflection from the object 14 (laser light including a sample signal) and the reference light L2 including the modulation signal (laser light including a modulation signal), and outputs the light receiving signal. The calculation unit 52 performs a calculation on the light receiving signal based on the reference signal Ss. The signal generation unit 61a outputs the drive signal Sd and the reference signal Ss.

The calculation unit 52 includes the preprocessing unit 53, the demodulation processing unit 55, and the correction processing unit 62a. The preprocessing unit 53 performs the preprocessing for extracting the frequency modulation component from the light receiving signal, and outputs the preprocessing signal S(t) including the frequency modulation component. The demodulation processing unit 55 mixes the preprocessing signal S(t) with the orthogonal signals to obtain the signals x and y (mixed signal), and then demodulates the sample signal from the signals x and y. The correction processing unit 62a outputs the amplification factor control signal Sam and the frequency control signal Sf2, which are correction signals, based on the output signal Sm output in response to the driving of the vibrator 30. The signal generation unit 61a corrects the drive signal Sd and the reference signal Ss based on the amplification factor control signal Sam and the frequency control signal Sf2.

With such a configuration, even when disturbance such as a temperature change is applied, the frequency and the amplitude of the drive signal Sd can be made to follow the change in the mechanical resonance frequency and the vibration amplitude of the vibrator 30. Accordingly, the frequency and the amplitude of the vibration of the vibrator 30 can be maintained constant. As a result, a decrease in S/N ratio of the modulation signal can be prevented, and a decrease in demodulation accuracy of the sample signal can be prevented. Accordingly, it is possible to implement the laser interferometer 1a capable of measuring the displacement and the velocity of the object 14 with high accuracy even when disturbance is applied. In addition, since the vibrator 30 can be driven near the mechanical resonance frequency of the vibrator 30 by using the signal generation unit 61a and the correction processing unit 62a, the power consumption of the laser interferometer 1a can be reduced.

In the embodiment, the correction processing unit 62a acquires, by orthogonal detection, the phase difference between the output signal Sm and the reference signal Ss and the amplitude of the output signal Sm. According to the orthogonal detection, the phase difference and the amplitude can be instantaneously acquired. Therefore, the correction processing can be performed in real time.

In the embodiment, the numerically controlled oscillator 616 is used as the oscillator of the signal generation unit 61. The numerically controlled oscillator 616 can generate a periodic signal based on the numerical value read from the ROM table. Therefore, the numerically controlled oscillator 616 can output the reference signals Ss and Ss', the cosine wave signal $\cos(\theta_m(t))$, and the sine wave signal $\sin(\theta_m(t))$ with high accuracy without being influenced by noise or the like. Accordingly, it is possible to improve the accuracy of the preprocessing and the demodulation processing in the calculation unit 52, and it is possible to improve the demodulation accuracy of the sample signal. As a result, the laser interferometer 1a capable of measuring the displacement and the velocity of the object 14 with higher accuracy can be implemented.

3. Modifications of Optical System

Next, first to fourth modifications of the optical system 50 will be described.

Figure 18:
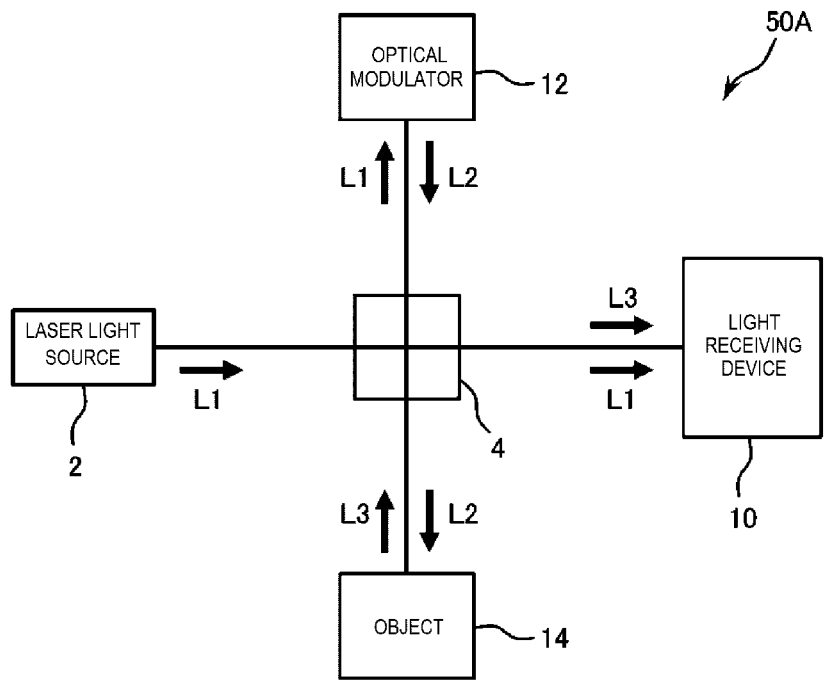
FIG. 18 is a schematic configuration diagram showing an optical system according to a first modification.
Figure 19:
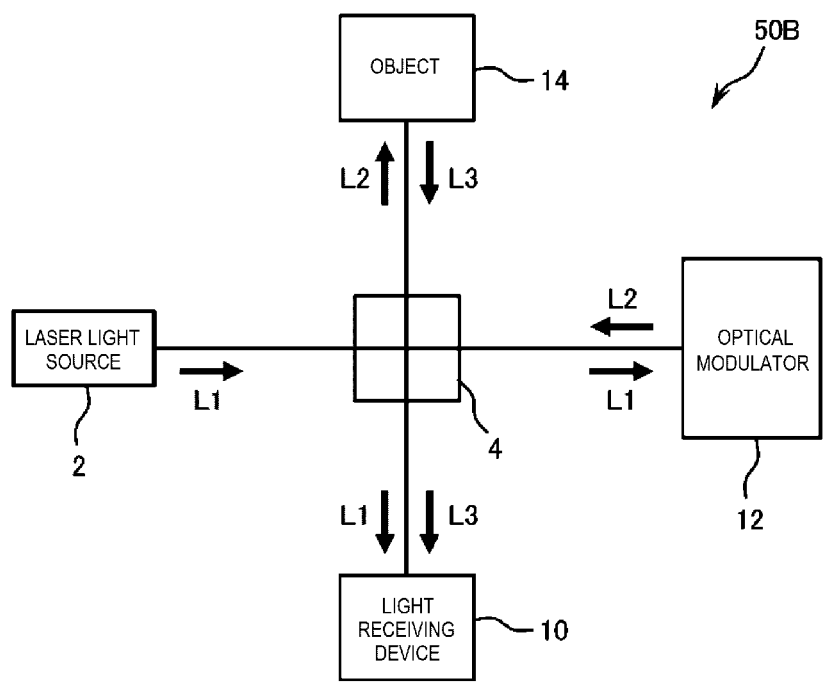
FIG. 19 is a schematic configuration diagram showing an optical system according to a second modification.
Figure 20:
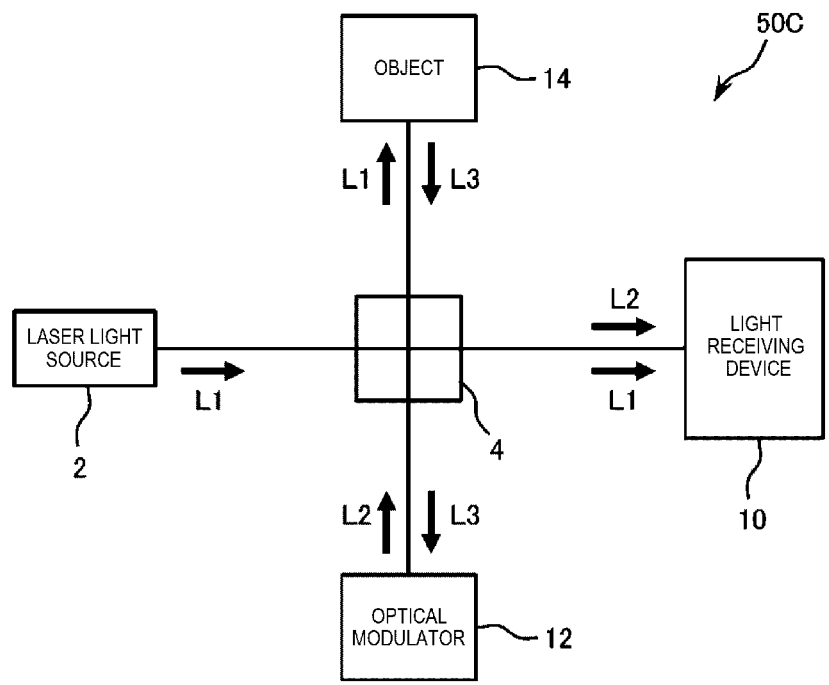
FIG. 20 is a schematic configuration diagram showing an optical system according to a third modification.
Figure 21:
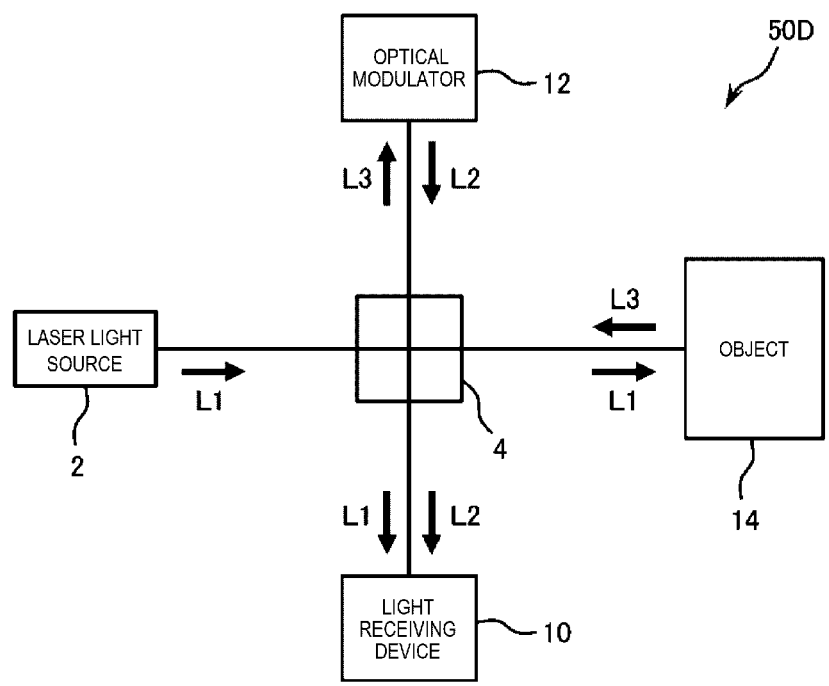
FIG. 21 is a schematic configuration diagram showing an optical system according to a fourth modification.

FIG. 18 is a schematic configuration diagram showing an optical system 50A according to a first modification. FIG. 19 is a schematic configuration diagram showing an optical system 50B according to a second modification. FIG. 20 is a schematic configuration diagram showing an optical system 50C according to a third modification. FIG. 21 is a schematic configuration diagram showing an optical system 50D according to a fourth modification.

Hereinafter, the first to fourth modifications of the optical system 50 will be described. In the following description, differences from the optical system 50 will be mainly described, and a description of the same matters will be omitted. In FIGS. 18 to 21, the same components as those in FIG. 2 are denoted by the same reference signs. In FIGS. 18 to 21, a part of the optical elements are not illustrated.

The optical system 50A shown in FIG. 18 is the same as the optical system 50 shown in FIG. 2 except that light incident on the photodetector 10, the optical modulator 12, and the object 14 is different. Specifically, in the optical system 50A shown in FIG. 18, the emission light L1 is incident on the photodetector 10 and the optical modulator 12. The optical modulator 12 shown in FIG. 18 modulates the emission light L1 to generate the reference light L2 including a modulation signal. Subsequently, the reference light L2 is incident on the object 14. Then, the object light L3, which includes a sample signal generated by the reference light L2 being reflected by the object 14, is incident on the photodetector 10. Therefore, the photodetector 10 shown in FIG. 18 receives the object light L3 including the sample signal and the modulation signal (laser light including the sample signal and the modulation signal), and the emission light L1.

The optical system 50B shown in FIG. 19 is the same as the optical system 50A shown in FIG. 18 except that an arrangement of the photodetector 10, the optical modulator 12, and the object 14 is different.

That is, the optical systems 50A and 50B according to the first and second modifications each include the laser light source 2, the optical modulator 12, and the photodetector 10. The laser light source 2 emits the emission light L1. The optical modulator 12 modulates the emission light L1 using a vibrator, and generates the reference light L2 including a modulation signal. The photodetector 10 receives the object light L3 including a modulation signal and a sample signal that is generated by the reference light L2 being reflected by the object 14 (laser light including a sample signal and a modulation signal), and the emission light L1, and outputs a light receiving signal.

The optical system 50C shown in FIG. 20 is the same as the optical system 50A shown in FIG. 18, except that an arrangement of the optical modulator 12 and the object 14 is different, and the light incident on the photodetector 10, the optical modulator 12, and the object 14 is different. Specifically, in the optical system 50C shown in FIG. 20, the emission light L1 is incident on the photodetector 10 and the object 14. The emission light L1 is reflected by the object 14 to generate the object light L3. Subsequently, the object light L3 is incident on the optical modulator 12. Then, the optical modulator 12 shown in FIG. 20 modulates the object light L3 to generate the reference light L2 including a sample signal and a modulation signal. The reference light L2 is incident on the photodetector 10. Therefore, the photodetector 10 shown in FIG. 20 receives the reference light L2 including the sample signal and the modulation signal (laser light including a sample signal and a modulation signal), and the emission light L1.

The optical system 50D shown in FIG. 21 is the same as the optical system 50C shown in FIG. 20 except that an arrangement of the photodetector 10, the optical modulator 12, and the object 14 is different.

That is, a laser interferometer including the optical systems 50C and 50D according to the third and fourth modifications includes the laser light source 2, the optical modulator 12, and the photodetector 10. The laser light source 2 emits the emission light L1. The optical modulator 12 includes a vibrator having a vibration component in a direction intersecting an incident surface of the object light L3, and modulates the object light L3 using a vibrator to generate the reference light L2 including a modulation signal. The object light L3 includes a sample signal generated by the emission light L1 being reflected by the object 14. The photodetector 10 receives the reference light L2 including the sample signal and the modulation signal (laser light including a sample signal and a modulation signal), and the emission light L1, and outputs a light receiving signal.

The optical systems 50A, 50B, 50C, and 50D as described above also have the same functions as those of the optical system 50 described above.

Although the laser interferometer according to the present disclosure has been described above based on the embodiments shown in the drawings, the laser interferometer according to the present disclosure is not limited to the embodiments described above. A configuration of each part can be replaced with a configuration having the same function. In addition, any other components may be added to the laser interferometer according to the embodiments described above. Further, the laser interferometer according to the present disclosure may include two of the embodiments described above. Each functional unit provided in the laser interferometer according to the present disclosure may be divided into a plurality of elements, or a plurality of functional units may be integrated into one.

The laser interferometer according to the present disclosure can be applied to, for example, a vibration meter, an inclinometer, and a distance meter (a length measuring device), in addition to the displacement meter or the velocimeter described above. Examples of application of the laser interferometer according to the present disclosure include an optical comb interference measurement technique that enables distance measurement, 3D imaging, spectroscopy, and the like, and an optical fiber gyro that implements an angular velocity sensor, an angular acceleration sensor, and the like.

Two or more of the laser light source, the optical modulator, and the photodetector may be mounted on the same substrate. Accordingly, a size and a weight of the optical system can be easily reduced, and it is easy to perform assembling.

Although a so-called Michelson interference optical system is provided in the embodiments described above, the laser interferometer according to the present disclosure can also be applied to an interference optical system of another type such as a Mach-Zehnder interference optical system.

What is claimed is:

1. A laser interferometer comprising:
a laser light source configured to emit laser light;
an optical modulator including a vibrator driven by a drive signal and configured to superimpose a modulation signal on the laser light using the vibrator;
a photodetector configured to receive the laser light including a sample signal superimposed thereon due to reflection by an object and the laser light including the modulation signal, and output a light receiving signal;
a calculation unit configured to perform a calculation on the light receiving signal based on a reference signal; and
a signal generation unit configured to output the drive signal and the reference signal, wherein
the calculation unit includes
a preprocessing unit configured to perform preprocessing for extracting a frequency modulation component from the light receiving signal based on the reference signal, and output a preprocessing signal including the frequency modulation component,
a demodulation processing unit configured to demodulate the sample signal from the preprocessing signal based on the reference signal, and
a correction processing unit configured to output a correction signal based on an output signal output in response to driving of the vibrator, and
the signal generation unit corrects the drive signal and the reference signal based on the correction signal.

2. The laser interferometer according to claim 1, wherein the correction processing unit corrects a frequency of the reference signal and a frequency of the drive signal based on a phase difference between the output signal and the reference signal.

3. The laser interferometer according to claim 2, wherein the correction processing unit corrects an amplitude of the drive signal based on an amplitude of the output signal.

4. The laser interferometer according to claim 3, wherein the correction processing unit acquires, by orthogonal detection, the phase difference between the output signal and the reference signal and the amplitude of the output signal.

5. The laser interferometer according to claim 4, wherein the signal generation unit includes
an oscillator configured to generate the reference signal, and
an amplifier configured to adjust an amplitude of the reference signal and output the adjusted reference signal as the drive signal.

6. The laser interferometer according to claim 5, wherein the vibrator is a quartz crystal resonator.

7. The laser interferometer according to claim 4, wherein the vibrator is a quartz crystal resonator.

8. The laser interferometer according to claim 3, wherein the signal generation unit includes
an oscillator configured to generate the reference signal, and
an amplifier configured to adjust an amplitude of the reference signal and output the adjusted reference signal as the drive signal.

9. The laser interferometer according to claim 8, wherein the vibrator is a quartz crystal resonator.

10. The laser interferometer according to claim 3, wherein the vibrator is a quartz crystal resonator.

11. The laser interferometer according to claim 2, wherein the signal generation unit includes
an oscillator configured to generate the reference signal, and
an amplifier configured to adjust an amplitude of the reference signal and output the adjusted reference signal as the drive signal.

12. The laser interferometer according to claim 11, wherein
the vibrator is a quartz crystal resonator.

13. The laser interferometer according to claim 2, wherein the vibrator is a quartz crystal resonator.

14. The laser interferometer according to claim 1, wherein the signal generation unit includes
an oscillator configured to generate the reference signal, and
an amplifier configured to adjust an amplitude of the reference signal and output the adjusted reference signal as the drive signal.

15. The laser interferometer according to claim 14, wherein
the oscillator is a voltage controlled oscillator that generates the reference signal by voltage control.

16. The laser interferometer according to claim 15, wherein
the vibrator is a quartz crystal resonator.

17. The laser interferometer according to claim 14, wherein
the oscillator is a numerically controlled oscillator that generates the reference signal by numerical control.

18. The laser interferometer according to claim 17, wherein
the vibrator is a quartz crystal resonator.

19. The laser interferometer according to claim 14, wherein
the vibrator is a quartz crystal resonator.

20. The laser interferometer according to claim 1, wherein the vibrator is a quartz crystal resonator.

* * * * *